(12) United States Patent
Jackson

(10) Patent No.: US 9,188,465 B1
(45) Date of Patent: Nov. 17, 2015

(54) KNITTING COUNTER

(71) Applicant: Sara Stadler Jackson, Omaha, NE (US)

(72) Inventor: Sara Stadler Jackson, Omaha, NE (US)

(*) Notice: Subject to any disclaimer, the term of this patent is extended or adjusted under 35 U.S.C. 154(b) by 321 days.

(21) Appl. No.: 13/907,965

(22) Filed: Jun. 2, 2013

Related U.S. Application Data

(60) Provisional application No. 61/656,520, filed on Jun. 7, 2012, provisional application No. 61/657,028, filed on Jun. 8, 2012, provisional application No. 61/676,328, filed on Jul. 26, 2012.

(51) Int. Cl.
*D04B 3/00* (2006.01)
*D04B 37/00* (2006.01)
*G01D 13/02* (2006.01)

(52) U.S. Cl.
CPC . *G01D 13/02* (2013.01); *D04B 3/00* (2013.01)

(58) Field of Classification Search
CPC ......... D04B 3/00; D04B 37/00; G06M 1/045; G06M 1/24; G06M 1/245; G06M 1/248; G09F 11/23
USPC ......... 116/223, 309, 311, 312, 313, 314, 315, 116/316, 317, 318, 320, 334; 235/108, 111, 235/112, 113, 114; 33/1 SD; 434/95; 66/1 A; D10/97
See application file for complete search history.

(56) References Cited

U.S. PATENT DOCUMENTS

| | | | |
|---|---|---|---|
| 214,234 A * | 4/1879 | Brady | 235/116 |
| 453,078 A * | 5/1891 | Delmel | 235/108 |
| 581,057 A * | 4/1897 | Brager | 235/113 |
| 1,553,086 A * | 9/1925 | Komorous | 116/308 |
| 2,210,173 A * | 8/1940 | Langbart | 66/1 A |
| 2,274,181 A * | 2/1942 | Ariani | 66/1 A |
| 2,276,062 A * | 3/1942 | Peyser | 235/114 |
| 2,366,422 A * | 1/1945 | Nelson | 235/116 |
| 2,486,184 A | 10/1949 | Harris | |
| 2,582,319 A | 1/1952 | Ellis | |
| 2,722,814 A | 11/1955 | Ferlazzo | |
| 2,821,953 A | 2/1958 | Langbart | |
| 2,825,505 A * | 3/1958 | Hall | 235/78 A |
| 2,887,858 A | 5/1959 | Sanders | |
| 2,918,035 A | 12/1959 | Thomas | |
| 3,032,003 A | 5/1962 | Lambert | |
| 3,071,321 A | 1/1963 | Ezopov | |
| 3,073,282 A | 1/1963 | Mcintosh | |

(Continued)

FOREIGN PATENT DOCUMENTS

| CA | 1085028 | 9/1980 |
|---|---|---|
| CA | 1189042 | 6/1985 |

(Continued)

OTHER PUBLICATIONS

Ablet llc, Home of the Knitting Abacus. Retrieved from the Internet: <http://knittingabacus.com/>. on Mar. 13, 2014.

(Continued)

*Primary Examiner* — R. A. Smith

(57) ABSTRACT

The embodiments of the present invention generally relate to or provide a counting apparatus for use with the art of hand knitting. Various embodiments of the present invention can provide, by way of one example, a knitting counter that can maintain multiple counts at the same time. By way of a further example, embodiments of the present invention can provide a knitting counter that can maintain multiple counts numbering at least eleven.

36 Claims, 14 Drawing Sheets

(56) References Cited

U.S. PATENT DOCUMENTS

| | | | |
|---|---|---|---|
| 4,114,405 A | 9/1978 | Bartels | |
| 4,343,160 A | 8/1982 | Turquet | |
| 4,470,273 A | 9/1984 | Budd | |
| 4,578,036 A * | 3/1986 | Leighton | 434/95 |
| D288,181 S | 2/1987 | Matsubayashi | |
| 4,764,943 A | 8/1988 | Okada | |
| 7,287,332 B2 * | 10/2007 | Dworman | 33/1 SD |
| D556,071 S | 11/2007 | Jitsuda | |
| 7,555,995 B1 * | 7/2009 | Stump et al. | 116/311 |
| 7,628,315 B2 * | 12/2009 | Duncan | 235/127 |
| 7,900,482 B2 | 3/2011 | Barry | |
| 8,506,303 B1 | 8/2013 | Smith | |
| 8,529,263 B1 | 9/2013 | Smith | |
| 8,615,319 B2 | 12/2013 | Felice | |
| D724,460 S * | 3/2015 | Jackson | D10/97 |
| D724,982 S * | 3/2015 | Jackson | D10/97 |
| 2009/0025625 A1 | 1/2009 | Lee | |
| 2012/0285204 A1 | 11/2012 | Coleman | |
| 2014/0374301 A1 | 12/2014 | West | |

FOREIGN PATENT DOCUMENTS

| | | | | |
|---|---|---|---|---|
| CA | 2776753 | | 11/2012 | |
| FR | 561527 A | * | 10/1923 | G09F 11/23 |
| FR | 956008 A | * | 1/1950 | D04B 3/00 |
| GB | 207083 A | * | 11/1923 | D04B 3/00 |
| GB | 520604 A | * | 4/1940 | D04B 3/00 |
| GB | 521782 A | * | 5/1940 | D04B 3/00 |
| GB | 533615 A | * | 2/1941 | D04B 3/00 |
| GB | 799404 A | * | 8/1958 | D04B 3/00 |
| GB | 2184271 A | * | 6/1987 | G06M 1/02 |

OTHER PUBLICATIONS

Addi Rotally Row Counter. Retrieved from the Internet: <http://www.addineedleshop.com/addi_accessories/rotally.htm>.on Mar. 16, 2014.
Bluecell Pink Color Pendant Style Mini Knitting Stitch Counter Row Counter. Retrieved from the Internet: <http://amzn.com/B00HFMUG8C>. on Mar. 13, 2014.
Boye Crochet Dude Knit Tally. Retrieved from the Internet: <http://amzn.com/B009GIJ6U2>. on Mar. 13, 2014.
Boye Electric Row Counter. Retrieved from the Internet: <http://amzn.com/B004I541DU>. on Mar. 13, 2014.
Boye Knit Tally. Retrieved from the Internet: <http://amzn.com/B000QHIG8A>.on Mar. 13, 2014.
Boye Circular Knit Counter. Retrieved from the Internet: <http://amzn.com/B005A2A8GO>. on Mar. 13, 2014.
Estone 1 pc Mini Multi Purpose Knit Knitting Stitch Row Counter Pendant Style. Retrieved from the Internet: <http://amzn.com/B00FVT2N6O>.
KA Knitting Counter with Lock Function. Retrieved from the Internet: <http://amzn.com/B00ALWH924>. on Mar. 13, 2014.
Lion Brand Yarn Row Counter. Retrieved from the Internet: <http://amzn.com/B0007LHJXS>. on Mar. 13, 2014.
Susan Bates Chain Counter for Jewelry Making. Retrieved from the Internet: <http://amzn.com/B009CFZWPC>. on Mar. 13, 2014.
Susan Bates Knit Counter. Retrieved from the Internet: <http://amzn.com/B00CMSZ2TW>. on Mar. 13, 2014.
Susan Bates Universal Knit Count. Retrieved from the Internet: <http://amzn.com/B00114Q0SA>.on Mar. 13, 2014.
BeeCount Knitting Counter. Retrieved from the Internet: <https://play.google.com/store/apps/details?id=com.knirirr.beecount>.
Cordless Dog Knit Counter. Retrieved from the Internet: <http://cordlessdog.com/knitcounter/>. on Mar. 13, 2014.
Finger Row Counter. Retrieved from the Internet: <http://www.knitpicks.com/accessories/Finger_Row_Counter_-_White_D81731.html>. on Mar. 13, 2014.
Row Counter Plus. Retrieved from the Internet: <http://www.knitpicks.com/accessories/Row_Counter_Plus_D81781.html>. on Mar. 16, 2014.
JKnit. Retrieved from the Internet: <http://www.jakrosoft.com/jknit.html>. on Mar. 16, 2014.
Knit—knitting counter for iOS. Retrieved from the Internet: <https://itunes.apple.com/us/app/knit-knitting-counter-for-ios/id473675243?mt=8>. on Mar. 16, 2014.
Knit Counter Lite. Retrieved from the Internet: <https://itunes.apple.com/us/app/knit-counter-lite/id310821956?mt=8>. on Mar. 13, 2014.
knitCompanion. Retrieved from the Internet: <https://www.knitcompanion.com/knitcompanion/>. on Mar. 13, 2014.
knitCompanion—Screenshots. Retrieved from the Internet: <https://www.knitcompanion.com/knitcompanion/screenshots/>. on Mar. 13, 2014.
KnitMinder. Retrieved from the Internet: <https://itunes.apple.com/us/app/knitminder/id311950990?mt=8>. on Mar. 13, 2014.
Knit-n-Count. Retrieved from the Internet: <https://itunes.apple.com/us/app/knit-n-count/id403436989?mt=8>. on Mar. 13, 2014.
Knitting Counter. Retrieved from the Internet: <https://play.google.com/store/apps/details?id=org.kuklake.rowCounter>. on Mar. 13, 2014.
Clover Knitting Counter "Mini" Kacha-Kacha. Retrieved from the Internet: <http://www.clover-usa.com/p/knitting-counter-mini-kacha-kacha>. on Mar. 13, 2014.
Clover Knitting Counter Kacha-Kacha. Retrieved from the Internet: <http://www.clover-usa.com/p/knitting-counter-kacha-kacha>. on Mar. 13, 2014.
Knitting Row Counter. Retrieved from the Internet: <https://www.etsy.com/listing/172380306/knitting-row-counter-now-with-new-colors>.
Little Dorrit Triple Knitting Counter. Retrieved from the Internet: <http://commons.wikimedia.org/wiki/File:Little_Dorrit_knitting_row_counter_002.jpg>. on Mar. 13, 2014.
Row Counter Plus. Retrieved from the Internet: <https://www.nancysknitknacks.com/row_counter_plus.htm>. on Mar. 13, 2014.
Row counter (hand knitting). Retrieved from the Internet: <http://en.wikipedia.org/wiki/Row_counter_(hand_knitting)>. on Mar. 13, 2014.
Row Counter Bracelets. Retrieved from the Internet: <https://www.etsy.com/search?q=row>. on Mar. 13, 2014.
StitchMinder. Retrieved from the Internet: <https://itunes.apple.com/us/app/stitchminder/id287491425?mt=8>.on Mar. 13, 2014.
Susan Bates Peg It Knitting Counter. Retrieved from the Internet: <http://www.ebay.com/sch/i.html?_kw=bates+peg+knitting+counter>. on Mar. 13, 2014.
The Knit Kit. Retrieved from the Internet: <http://www.theknitkit.com/>. on Mar. 13, 2014.
Applicant's Response, filed Aug. 17, 2014 for U.S. Appl. No. 29/489,405.

* cited by examiner

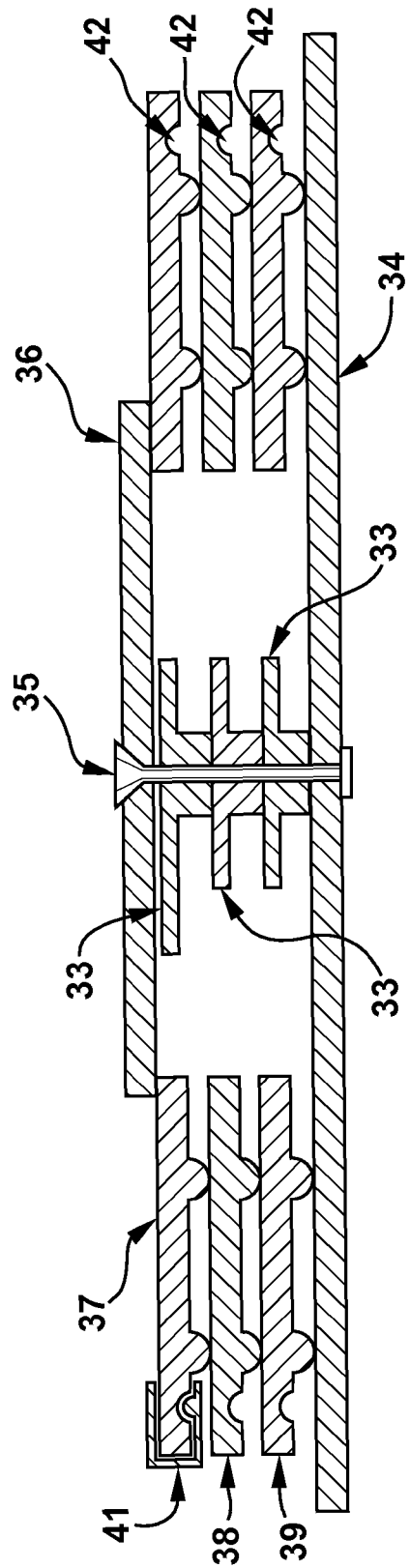

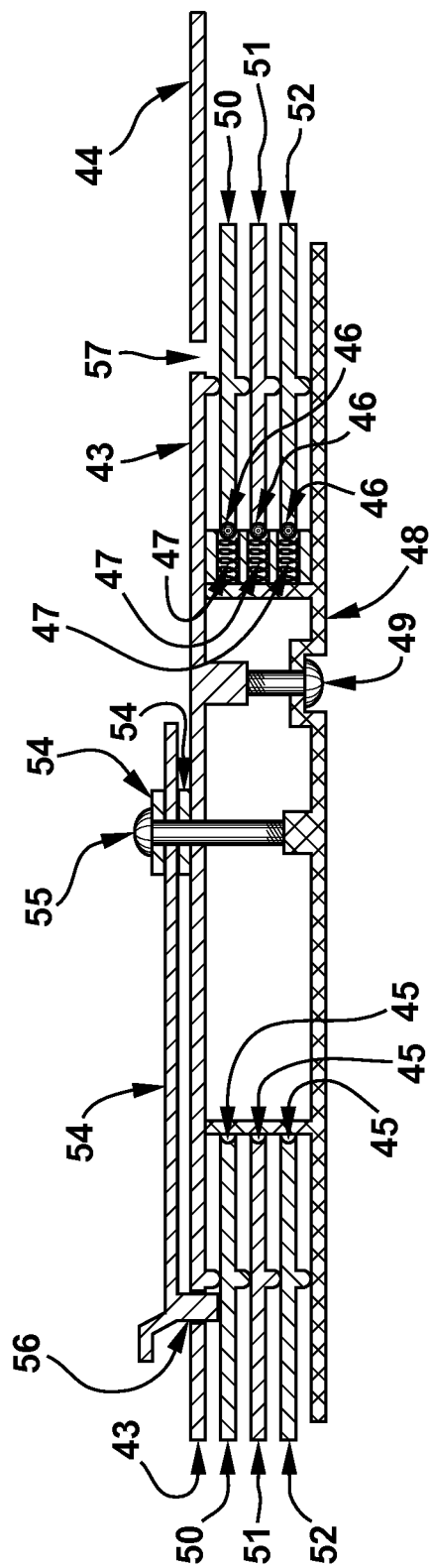

KNITTING COUNTER

CROSS-REFERENCE TO RELATED APPLICATIONS

This application claims priority to U.S. Provisional Application Ser. No. 61/656,520, filed Jun. 7, 2012, and also claims priority to U.S. Provisional Application Ser. No. 61/657,028, filed Jun. 8, 2012, and also claims priority to U.S. Provisional Application Ser. No. 61/676,328, filed Jul. 26, 2012, each of which is herein incorporated by reference in its entirety.

BACKGROUND OF THE INVENTION

Conventional counting devices for the art of hand knitting are designed to count rows in a pattern; thus, they generally consist of an apparatus that displays two digits side by side. Each digit can be one of a range of ten numerals from 0 to 9, inclusive. The first digit, shown on the left, represents the tens column of a number; and the second digit, shown on the right, represents the ones column of a number. Using these two digits, a conventional knitting counter can display one number from 0 to 99, inclusive. One such example of a conventional knitting counter is the "Circular Row Counter" from Boye; another such example is the "Knitting Counter 'Kacha-Kacha'" from Clover.

Notwithstanding these conventional counters, however, most patterns do not provide users with instructions by row number, from start to finish. Instead, most patterns instruct users to undertake several actions, often at the same time, for a specified (but limited) number of repeats. A repeat can be a row, but it need not be. An instruction might read, for example, "Work the increase in Row 11 at each end of every 12th row 5 more times, continuing to work Rows 1 through 24 of Cable Pattern A as established." In this instruction, the first repeat consists of rows between and including increase rows; the second repeat consists of the number of increase rows worked; and the third repeat consists of the rows in Cable Pattern A. In the foregoing example, as in the substantial majority of patterns, the repeats do not exceed 36, but the pattern asks a user to count several repeats at once. Conventional counting devices thus are not helpful for following patterns that include a repeating count. First, because they use only the numerals 0 through 9, conventional counting devices require two digits to express any number exceeding 9. Second, because they display only two digits, conventional counting devices do not provide users with the ability to display more than one number exceeding 9. Third, as a consequence, conventional counters do not provide users with the ability to count a first repeat exceeding 9 while also counting a second or third repeat that exceeds 9. Again, many patterns require users to maintain multiple counts at the same time.

Accordingly, there is a need in the art for a counting apparatus for knitting that can maintain multiple counts at the same time. There is a further need in the art for a counting apparatus that can maintain multiple counts for at least the numbers 1 through 36.

SUMMARY OF THE INVENTION

The embodiments of the present invention generally relate to counting devices that may be used by practitioners of the art of hand knitting, who often refer to patterns that specify how a particular item is to be constructed. More specifically, various embodiments of the present invention give knitters the ability to maintain multiple counts and display multiple numbers on the same apparatus. Further, by focusing primarily on a narrower range of numbers, various embodiments of the present invention also give knitters the ability to display more of the numbers they are most likely to use when following a pattern. Accordingly, various embodiments of the present invention provide a counting apparatus for knitting that includes a plurality of faces or face means. The face of face means of any embodiment of the present invention can be circular, substantially circular, oval, or polygonal, any combination thereof, or comprise any other suitable shape. By way of example, a face or face mean in any embodiment can comprise any suitable element useful for a counting device, including, but not limited to, at least one of a dial or a ring. One or more faces or face means in any embodiment can be rotatable in relation to one or more other faces or face means that are fixed in relation to a base. The faces and face means can be, but are not necessarily, coaxial in embodiments of the present invention. The corresponding structure for a face means can correspond to at least one of a dial or ring as described herein with respect to FIG. 1A to FIG. 6. Moreover, a plurality of counting symbols, including, but not limited to, numerals, can be located on an upper surface of one or more of the one or more faces or face means. An indexer or indexing means such as ratchet(s), pawl(s), gear(s), "click(s)," detent(s), ball(s), pin(s), or plunger(s), for example, can be used to rotatably position one or more of the plurality of faces or face means in relation to the other(s). Each of the one or more rotatable faces or face means can also be rotatably positioned by using friction, which can be generated by constructing the apparatus so as to make its surfaces slide against each other. Any of the embodiments of the present invention described herein, such as those described with respect to FIG. 1A through FIG. 6, may be used with a knitting pattern.

Accordingly, one embodiment of the present invention provides a counting apparatus for knitting that includes a plurality of faces, one or more of which are rotatable in relation to the other(s). The apparatus can include a first face including a plurality of counting symbols. The apparatus can further include a second face with an indexer or indexing means to rotatably position the second face in relation to the first face. Alternatively, the first face may comprise the indexer or indexing means. The first and second faces can also be rotatably positioned in relation to each other using friction. A base or base means can hold or secure the first face and the second face. The base or base means may comprise the indexer or indexing means.

In one example, the apparatus can include a first face comprising a first diameter and a first plurality of counting symbols that are located on an upper surface of the first face. The apparatus can further include a second face comprising a second diameter that is greater than the first diameter at one or more locations along the circumference of the second diameter. The second face can be positioned coaxially with the first face. An indexer or indexing means can be used to rotatably position the second face in relation to the first face. The first and second faces can also be rotatably positioned in relation to each other using friction. The plurality of faces can be coupled to one or more bases or base means, using one or more posts or post means, brackets, screws, tabs, or portion(s) of the base or base means itself, for example. The one or more base(s) or base means can rest in a user's hand.

Another embodiment of the present invention provides a counting apparatus for knitting that includes a plurality of rotatable faces. The apparatus can include a first face including a first plurality of counting symbols, with a first indexer to rotatably position the first face. The apparatus can further include a second face including a second plurality of counting symbols, with a second indexer to rotatably position the second face. The first and second faces can also be rotatably positioned using friction. One or more base(s) or base means can hold or secure the first face and the second face.

In one example, the apparatus can include a first rotatable face comprising a first diameter and a first plurality of counting symbols that are located on an upper surface of the first face. A first indexer or indexing means can be used to rotatably position the first face. The apparatus can further comprise a second rotatable face comprising a second diameter that is greater than the first diameter at one or more locations along the circumference of the second diameter. The second face can be positioned coaxially with the first face. A second plurality of counting symbols can be located on an upper surface of the second face. A second indexer or indexing means can be used to rotatably position the second face. The first and second faces can also be rotatably positioned using friction. The plurality of rotatable faces can be coupled to one or more bases or base means, using one or more posts or post means, brackets, screws, tabs, or portion(s) of the base(s) or base means themselves, for example. The base(s) or base means can rest in a user's hand.

Another embodiment provides a counting apparatus for knitting that includes a plurality of dials. The dials can be, but are not necessarily, coaxial in embodiments of the present invention. In one example, the apparatus can include a first dial comprising a first diameter and a first plurality of counting symbols that are located on an upper surface of the first dial. A first indexer or indexing means can be used to rotatably position the first dial. The apparatus can further comprise a second dial comprising a second diameter that is greater than the first diameter at one or more locations along the circumference of the second diameter. The second dial can be positioned beneath and coaxially with the first dial. A second plurality of counting symbols can be located on an upper surface of the second dial. A second indexer or indexing means can be used to rotatably position the second dial. The first and second dials can also be rotatably positioned using friction. One or more bases or base means, which can rest in a user's hand, can be coupled to one or more posts or post means and can be located beneath the plurality of dials.

A further embodiment provides a counting apparatus for knitting that includes a plurality of dials, wherein two or more of the dials are not coaxial. For example, the apparatus can include a first dial comprising a first diameter and a first plurality of counting symbols that are located on an upper surface of the first dial. A first indexer or indexing means can be used to rotatably position the first dial. The apparatus can further include a second dial comprising a second diameter that is the same as, or different from, the first diameter. The second dial can be positioned inside the circumference of the first dial, for example. The second dial also can be positioned next to the first dial such that the first dial can be manipulated by a user's left thumb and the second dial can be manipulated by the user's right thumb, for example. In both examples, a second plurality of counting symbols can be located on an upper surface of the second dial and a second indexer or indexing means can be used to rotatably position the second dial. The first and second dials can also be rotatably positioned using friction. One or more bases or base means, which can rest in a user's hand, can hold the plurality of dials.

Further embodiments can include more than two dials and corresponding indexers or indexing means. By way of example, one embodiment can include a third dial comprising a third diameter that is greater than the second diameter at one or more locations along the circumference of the second diameter. The third dial can be positioned beneath and coaxially with the second dial, or it can be located on a different axis than the second dial, for example. A third plurality of counting symbols can be located on an upper surface of the third dial. A third indexer or indexing means can be used to rotatably position the third dial. The third dial can also be rotatably positioned using friction. One or more posts or post means can be used to coaxially align the one or more dials of embodiments of the present invention.

Another embodiment of the present invention provides a counting apparatus for knitting that includes a plurality of rings, one or more of which are rotatable in relation to the other(s). The apparatus can include a first ring including a plurality of counting symbols. The apparatus can further include a second ring with an indexer to rotatably position the second ring in relation to the first ring. Alternatively, the first ring may comprise the indexer. The first and second rings can also be rotatably positioned in relation to each other using friction. One or more bases can hold or secure the first ring and the second ring. Alternatively, or in addition, another face or faces can hold or secure the first ring and the second ring. The base(s) or face(s) may comprise the indexer.

In one example, the apparatus can include a first ring comprising a first diameter and a first plurality of counting symbols that are located on an upper surface of the first ring. The apparatus can further comprise a second ring comprising a second diameter that is greater than the first diameter at one or more locations along the circumference of the second diameter. The second ring can be positioned coaxially with the first ring. An indexer or indexing means can be used to rotatably position the second ring in relation to the first ring. The first and second rings can also be rotatably positioned in relation to each other using friction. The plurality of rings can be coupled to one or more bases or base means using one or more posts or post means, bracket(s), screw(s), tab(s), or portion(s) of the base itself, for example. Alternatively, or in addition, the plurality of rings can be coupled to one or more bases or base means using one or more other faces. The base(s) or base means or face(s) can rest in a user's hand.

Another embodiment provides a counting apparatus for knitting that includes a plurality of rotatable rings. Two or more of the plurality of rotatable rings can be, but are not necessarily, concentric in embodiments of the present invention. In one example, the apparatus can comprise a first ring comprising a first inner diameter and a first outer diameter. A first plurality of counting symbols can be located on an upper surface of the first ring. A first indexer or indexing means can be used to rotatably position the first ring. The apparatus can also include a second ring comprising a second outer diameter and a second inner diameter that is equal to or greater than the first outer diameter at one or more locations along the circumference of the second inner diameter, wherein the second ring is positioned concentrically about the first ring. A second plurality of counting symbols can be located on an upper surface of the second ring. A second indexer or indexing means can be used to rotatably position the second ring. The first and second rings can also be rotatably positioned using friction. The apparatus can also include one or more bases or base means, which can rest in a user's hand, that hold the plurality of rings.

Further embodiments can include more than two rings and corresponding indexers or indexing means. By way of example, one embodiment can include a third ring comprising a third outer diameter and a third inner diameter that is equal to or greater than the second outer diameter at one or more locations along the circumference of the third inner diameter. The third ring can be, but is not necessarily, positioned concentrically about the second ring. For example, each of the three rings can be positioned in a row or array in the apparatus such that none of the rings overlaps another ring. A third plurality of counting symbols can be located on an upper surface of the third ring. A third indexer or indexing means can be used to rotatably position the third ring. The third ring can also be rotatably positioned using friction.

Additional embodiments can provide a counting apparatus for knitting that includes one or more dials and one or more rings, one or more of which are rotatable in relation to the other(s). The apparatus can include a dial including a plurality of counting symbols. The apparatus can further include one or more rings, each of which comprises an indexer to rotatably position that ring in relation to the dial. Alternatively, the dial may comprise the indexer(s). The dial and ring(s) can also be rotatably positioned in relation to each other using friction. One or more bases can hold or secure the dial and the ring(s). Alternatively, or in addition, one or more other faces can hold or secure the dial and the ring(s). The base(s) or the face(s) may comprise the indexer.

In one example, the apparatus can include a dial comprising a first diameter and a first plurality of counting symbols that are located on an upper surface of the dial. The apparatus can further comprise a first ring, a second ring, and a third ring, for example, each comprising an outer diameter that is greater than the first diameter at one or more locations along the circumference of the outer diameter. Alternatively, or in addition, each ring can comprise a knob or other indicium at a location on its circumference, which knob or indicium enables a portion of the ring to protrude from the circumference of the dial when the apparatus is viewed from the top. The ring(s) can be positioned coaxially with the dial. An indexer or indexing means can be used to rotatably position the ring(s) in relation to the dial. The dial and ring(s) can also be rotatably positioned in relation to each other using friction. The dial and rings(s) can be coupled to one or more bases or base means, using one or more posts or post means, bracket(s), screw(s), tab(s), or portion(s) of the base(s) itself, for example. The base(s) or base means can rest in a user's hand.

Additional embodiments can provide a counting apparatus for knitting that includes an indicator "hand," as might be found on a timepiece, that can be coupled to at least one face or face means. For example, the apparatus can include a first dial comprising a first diameter and a first plurality of counting symbols that are located on an upper surface of the first dial. The apparatus can further include a first ring, a second ring, and a third ring, for example, wherein the rings are positioned coaxially or concentrically with the dial. Each ring can comprise an outer diameter that is equal to or greater than the first diameter at one or more locations along the circumference of the outer diameter. Alternatively, or in addition, each ring can comprise a knob or other indicium at a location on its circumference, which knob or indicium enables a portion of the ring to protrude from the circumference of the dial when the apparatus is viewed from the top. One or more first indexers or indexing means can be used to rotatably position the rings in relation to the dial. Each of the dial and the rings can also be rotatably positioned using friction. The apparatus can further include one or more indicator hands coupled to the dial at its axis, which hand(s) can rotate around the axis to indicate one or more counting symbols on the circumference of the dial. One or more indexers or indexing means can be used to rotatably position the hand(s) in relation to each other or the dial. The hand(s) can be rotatably positioned in relation to each other using friction. Alternatively, or in addition, the hand(s) can be rotatably positioned in relation to the dial using friction, as between tab(s) on the hand(s) and slot(s) in the dial, for example, or slot(s) in the hand(s) and tab(s) on the dial. One or more bases or base means can be coupled to the dial, the ring(s), and/or the hand(s) using one or more posts or post means, bracket(s), screw(s), tab(s), or portion(s) of the base(s) or hand(s) themselves, for example. The base(s) or base means can rest in a user's hand.

In another example, the apparatus can include a first dial comprising a first diameter and a first plurality of counting symbols that are located on an upper surface of the first dial. A first indexer or indexing means can be used to rotatably position the first dial. The apparatus can further include a first ring comprising a second outer diameter and a second inner diameter that is equal to or greater than the first diameter at one or more locations along the circumference of the second inner diameter, wherein the ring is positioned concentrically with the dial. A second plurality of counting symbols can be located on an upper surface of the first ring. A second indexer or indexing means can be used to rotatably position the first ring. One or more dials and one or more rings can be added to the apparatus, each dial or ring having a plurality of counting symbols and an indexer or indexing means. Each of the dial(s) and ring(s) can also be rotatably positioned using friction. The apparatus can further include one or more indicator hands coupled to the first dial at its axis, which hand(s) can rotate around the axis to indicate one or more counting symbols on the circumference of the first dial or the first ring. A third indexer or indexing means can be used to rotatably position the hand(s), or the hand(s) can be rotatably positioned using friction. One or more bases or base means can be coupled to the dial(s), the ring(s), and/or the hand(s) using one or more posts or post means, bracket(s), screw(s), tab(s), or portion(s) of the base(s) or hand(s) themselves, for example. The base(s) or base means can rest in a user's hand.

Another embodiment provides a counting apparatus for knitting that includes a plurality of rotatable indicator hands, which can, but need not, rotate independently of each other. The rotatable hands can be, but are not necessarily, coaxial in embodiments of the present invention. One or more indexers or indexing means such as ratchet(s), pawl(s), gear(s), click(s), detent(s), ball(s), pin(s), or plunger(s), for example, can be used to rotatably position each of the plurality of hands. Each of the plurality of hands can be rotatably positioned in relation to each other using friction, or the hand(s) can be rotatably positioned in relation to the dial(s) or ring(s) using friction, as between a tab and a slot, for example. By way of example, one embodiment can include a first fixed or rotatable dial comprising a first plurality of counting symbols that are located on an upper surface of the dial. If the first dial rotates, a first indexer or indexing means can be used to rotatably position the first dial. The apparatus can further include a second fixed or rotatable dial that is located entirely within the circumference of, and is coupled to, the first dial. A second plurality of counting symbols can be located on an upper surface of the second dial. If the second dial rotates, a second indexer or indexing means can be used to rotatably position the second dial. The apparatus can further include a plurality of rotatable hands coupled to the first dial at its axis, which hands can rotate around that axis to indicate a plurality of counting symbols on the circumference of the first dial. In addition, the apparatus can include a further rotatable hand coupled to the second dial at its axis, which hand can rotate around that axis to indicate a plurality of counting symbols on the circumference of the second dial. Further indexers or indexing means can be used to rotatably position each of the hands. Each of the rotatable dials and rotatable hands can also be rotatably positioned using friction. One or more bases or base means can be coupled to the dial(s) and/or the hand(s) using one or more posts or post means, bracket(s), screw(s), tab(s), or portion(s) of the base(s) or hand(s) themselves, for example. The base(s) or base means can rest in a user's hand.

Another embodiment provides a counting apparatus for knitting that includes one or more objects that fit either into or onto a surface or around an edge of the dial(s), ring(s), or base(s). The size, shape, and/or placement of these objects can correspond to the width of one counting symbol. These objects can act as "stops," informing the user that the repeat being counted has reached the beginning or the end of a count or has skipped a numeral in the count as specified in the pattern. A stop may take any shape, including the shape of a hand, for example. A hand may function as a stop.

A further embodiment provides a method for knitting using an apparatus that includes a first face including a first plurality of counting symbols numbering at least eleven and a base that secures the first face, a second face, and a third face. First, a second face is rotated with respect to the first face to indicate a first count. Second, a third face is rotated with respect to the first face to indicate a second count.

Yet another embodiment provides a method for knitting using an apparatus that includes a plurality of faces and a base for securing the plurality of faces. First, a first face is rotated with respect to the base to indicate a first count, wherein the first face includes a first plurality of counting symbols numbering at least eleven. Second, a second face is rotated with respect to the base to indicate a second count, wherein the second face includes a second plurality of counting symbols numbering at least eleven. Any of the apparatuses described herein, including those described with respect to FIG. 1A through FIG. 6, can be used with the method of any embodiment of the present invention.

None of the aspects, embodiments, features, improvements, or actual or potential advantages described herein should be considered a limitation on any embodiment or the present invention, unless expressly claimed. Similarly, unless otherwise expressly stated, it is in no way intended that any embodiment set forth herein be construed as requiring that its steps or process be performed in a specific order. This holds for any possible non-express basis for interpretation, including matters of logic with respect to arrangement of steps or operational flow, plain meaning derived from grammatical organization or punctuation, or the number or type of embodiments described in the specification.

DESCRIPTION OF THE DRAWINGS

The accompanying drawings, which are incorporated in and constitute part of this specification, illustrate embodiments of the invention, and together with the description, serve to explain the principles of various embodiments of the invention. The embodiments described in the drawings and specification in no way limit or define the scope of the present invention.

FIG. 4C depicts the embodiment in FIG. 4A from the side and cut in half along a diameter that begins at the 330° position and ends at the 150° position.

FIG. 5C depicts the embodiment in FIG. 5A from the side and cut in half along a diameter that begins at the 180° position and ends at the 0° position.

Figure 1A:
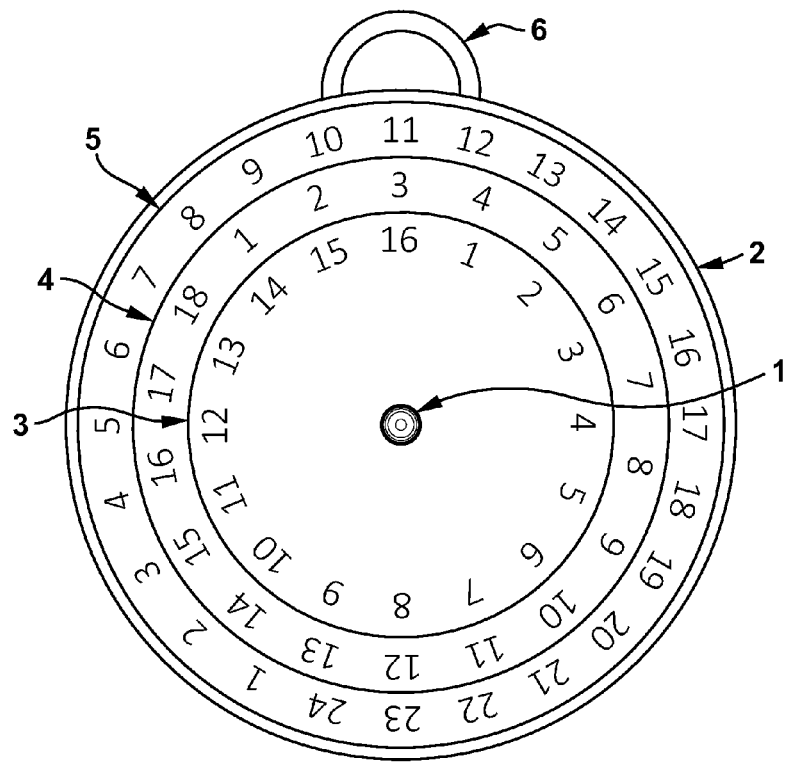
FIG. 1A shows, from the top, an apparatus of one embodiment of the present invention including three dials.

The present invention has been illustrated in relation to embodiments which are intended in all respects to be illustrative rather than restrictive. Those skilled in the art will realize that the present invention is capable of many modifications and variations without departing from the scope of the present invention.

DETAILED DESCRIPTION OF THE INVENTION

A first embodiment of the present invention comprises a knitting counter that includes a plurality of faces, one or more of which can rotate in relation to the others. One or more of the plurality of faces can include a plurality of counting symbols useful for maintaining a knitting count. For example, an upper surface of a face can be printed, painted, etched, embossed, engraved, and/or stamped, for example, with counting symbols around part or all of its circumference. If it rotates, each face can be rotatably positioned in relation to the other faces by an indexer or indexing means, which can include, but is not limited to, ratchet(s), pawl(s), gear(s), click(s), detent(s), ball(s), pin(s), and plunger(s), for example. Each of the rotatable faces also can be positioned using friction. The faces can be coupled to each other and/or to one or more bases that can rest in the user's hand. The face(s) or base(s) can comprise a marking or other indicia that enable a user to select, by rotation, one counting symbol on the one or more faces.

Another embodiment of the present invention comprises a knitting counter that includes a plurality of rings, one or more of which can rotate in relation to the others. One or more of the plurality of rings can include a plurality of counting symbols useful for maintaining a knitting count. For example, an upper surface of a ring can be printed, painted, etched, embossed, engraved, and/or stamped, for example, with counting symbols around part or all of its circumference. If it rotates, each ring can be rotatably positioned in relation to the other rings by an indexer or indexing means, which can include, but is not limited to, ratchet(s), pawl(s), gear(s), click(s), detent(s), ball(s), pin(s), and plunger(s), for example. Each of the rotatable rings also can be positioned using friction. The rings can be coupled to each other and/or to one or more bases that can rest in the user's hand. The ring(s) or base(s) can comprise a marking or other indicia that enable a user to select, by rotation, one counting symbol on the one or more rings.

Further embodiments of the present invention comprise a knitting counter that includes a plurality of dials and/or rings of varying diameters, which dials or rings can rotate independently of each other around a single axis and which can be held in place by ratchets, pawls, gears, clicks, detents, balls, pins, plungers, other indexing means, and/or components or combinations thereof. The dials and/or rings can also be held in place using friction. The circumferences of the dials and/or rings can be printed, painted, etched, embossed, engraved, and/or stamped, for example, with counting symbols around part or all of the circumferences. The dials and/or rings can be coupled to one or more bases that can rest in the user's hand. The face(s) or base(s) can comprise a marking or other indicia that enable a user to select, by rotation, one counting symbol on the one or more faces.

In one embodiment of the present invention, for example, a plurality of dials including regularly varying diameters are stacked upon each other in order of size, with the dial having the smallest diameter on top and the dial having the largest diameter on the bottom. The dials, which can rotate independently of each other, can share an axis located at the center of each dial through which one or more posts or post means secures the dials to each other and to one or more bases or base means. The base(s) can rest beneath the largest dial. As concerns rotation, each dial can be held temporarily in place, relative to the base(s) and the other dials, by a ratchet wheel or means coupled to that dial. The ratchet wheel and means can be designed so as to engage a pawl or pawl means that is attached to the adjoining base or dial. The pawl or pawl means also can be attached to the adjoining post.

When the dials are stationary, the ratchet wheels can rest against their adjoining pawls to hold the dials in place. When one or more of the dials is turned, the one or more ratchet wheels or ratchet means can engage the one or more adjoining pawls as the one or more dials advance. Around the circumference of each of the dials can be printed a quantity of counting symbols that matches the quantity of "teeth" on the ratchet wheel coupled or corresponding to that dial. Printed on the base(s) can be one or more markings or other indicia that enables a user to select, by rotation, one counting symbol on each dial. Atop the smallest dial can be one or more indicator hands or means, as might be found on a timepiece, that rotate around the axis independently of the dials and, when rotated, indicate one or more counting symbols on the circumference of the smallest dial. A ratchet wheel or pawl can be attached to each hand to interact with a pawl or ratchet wheel attached to either the top of the smallest dial beneath it or a post. In each case, the ratchet wheel and pawl can hold the hand in place when the hand is stationary and can engage one another when the hand is moved relative to the dial beneath it.

Using the embodiment in the preceding paragraph, if a user wished to advance a single interval by rotating a single dial, she could hold onto the dial or base beneath the selected dial, then rotate the selected dial with her other hand. If a user wished to advance several intervals simultaneously, she could rotate several dials simply by rotating the largest of the selected dials; the ratchet wheels and pawls coupled or corresponding to the smaller of the selected dials would hold those dials in place atop the largest selected dial, which would rotate against the base or dial beneath it.

Accordingly, various embodiments can provide a counting apparatus for knitting that includes a plurality of stacked coaxial dials. The apparatus can comprise a first dial comprising a first diameter and a first plurality of counting symbols that are located on an upper surface of the first dial. A first indexer or indexing means can be used to rotatably position the first dial. In the alternative, the first dial may be rotatably fixed in relation to the base. The apparatus also can include a second dial comprising a second diameter that is greater than the first diameter. The second dial can be positioned beneath and coaxially with the first dial. Like the first dial, the second dial can include a second plurality of counting symbols on an upper surface of the second dial. A second indexer or indexing means can be used to rotatably position the second dial. In the alternative, the second dial may be rotatably fixed in relation to the base. If they rotate, the first and second dial can also be held in place using friction. One or more bases or base means can be coupled to the post or post means and can be located beneath the largest dial. In further embodiments, the first indexer can comprise a first ratchet wheel coupled to a bottom surface of the first dial. The first ratchet wheel can engage a first pawl to rotatably position the first dial. Similarly, the second indexer can comprise a second ratchet wheel coupled to a bottom surface of the second dial. The second ratchet wheel can engage a second pawl to rotatably position the second dial.

A plurality of counting symbols in any embodiment of the present invention can be affixed to one or more components of the apparatus, such as to one or more dials, and can comprise a continuous list of counting symbols. In one embodiment, for example, as concerns counting symbols that may be printed or affixed on the surfaces, such as on a dial, each surface can contain 24 counting symbols. Of course, the embodiments of the present invention can use any suitable number of counting symbols. By way of example only, the smallest face can include the following sequence of numerals and symbols: 0, 1, 2, 3, 4, 5, 6, 7, 8, 9, 0, 1, 2, 3, 4, 5, 6, 7, 8, 9, followed by up to four symbols. By way of further example, the other faces can contain the following sequence of numerals: 1, 2, 3, 4, 5, 6, 7, 8, 9, 10, 11, 12, 13, 14, 15, 16, 17, 18, 19, 20, 21, 22, 23, 24. This arrangement of counting symbols on the faces permits a user to maintain two types of counts, as follows: (1) the first type of count using the indicator hand and the smallest dial or innermost face, whereby the hand identifies a digit representing the tens column of a numeral and the dial combines with an indicium on the base to identify a digit representing the ones column of that numeral, or vice versa, for a minimum count of 0 and a maximum count of 99; and (2) the second type of count whereby the other faces combine with indicia on the base to identify several numerals in the range of 1 through 24, inclusive. The plurality of counting symbols can be affixed, such as to a first, second, or third dial, for example, by at least one of printing, painting, etching, embossing, engraving, and stamping. In further embodiments, the plurality of counting symbols can correspond to a plurality of teeth of a ratchet wheel coupled to the dial, such as to a plurality of teeth for a first dial. For example, a dial with the numerals 1 through 24 affixed on an upper surface can be coupled to a ratchet wheel on a lower surface that includes 24 teeth.

In further embodiments, the pawl for a given dial's ratchet wheel can be coupled to the dial beneath. For example, the pawl for the first ratchet wheel can be coupled to the second dial; likewise, the pawl for the second ratchet wheel can be coupled to the third dial, and so on. In the alternative, or in addition, the pawl for any ratchet wheel can be coupled to a base or a post. Accordingly, various embodiments of the present invention can include one or more pawls that are attached to dials as well as one or more pawls that are attached to a base or a post.

One or more bases of further embodiments can comprise one or more indicia that enable a user to select, by turning, a counting symbol on at least one of the first dial and the second dial, for example. In further embodiments, an indicator hand can be located above the first dial, wherein the hand is rotatable to indicate a counting symbol on the first dial. A ratchet wheel and a pawl can be used to rotatably position the hand in any embodiment. For example, the ratchet wheel can be coupled to the hand and the pawl can be coupled to the first dial. In the alternative, the pawl can be coupled to the hand and the ratchet wheel can be coupled to the first dial, for example. In yet another example, either the teeth of the ratchet or the pawl can be coupled to, or comprise, a post. The hand can be coupled to a post.

Further embodiments can include a third, a fourth, and even a fifth dial, and can be constructed according to any of the embodiments described herein. For example, one embodiment can include a third dial comprising a third diameter that is greater than the second diameter, with the third dial positioned beneath and coaxially with the second dial. A third plurality of counting symbols can be located on an upper surface of the third dial. A third indexer can be used to rotatably position the third dial. In the alternative, the third dial may be rotatably fixed in relation to the base. If it rotates, the third dial can also be held in place using friction. The post(s) can be used to coaxially align the first dial, the second dial, and the third dial. The third indexer can comprise a third ratchet wheel coupled to a bottom face of the third dial, with the third ratchet wheel engaging a third pawl to rotatably position the third dial. The third pawl can be coupled to the second dial, a base, or a post.

The number of dials described herein is unlimited, although the more dials are included, the larger the counter may become. Similarly, the number of counting symbols described herein is unlimited, although the more counting symbols are included, the larger the counter may become. A counter of any size is possible, but the counter is preferably one that a user can hold in one or two hands.

Further embodiments can include one or more rings. One or more bases of any embodiment can include one or more guides or channels on or in which to place one or more rings. A guide can be located on the same plane as a base or on different planes than a base. A channel can be recessed into a base. In one embodiment, for example, the base can include a first circular channel into which the first ring is seated. The base can include a second circular channel into which the second ring is seated, a third circular channel into which a third ring is seated, and so on. The base(s) of any embodiment can comprise or include one or more retainers, such as one or more brackets or screws or tabs, for securing any ring to a guide or in a channel. A hand also can secure a ring to a guide or in a channel. Alternatively, or in addition, a hand can secure a ring to one or more bases.

When the rings are stationary, ball detents, for example, consisting of spheres or portions of spheres and their corresponding holes or indentations, can engage to hold the rings in place. When one or more of the rings is turned, the one or more holes or indentations can disengage their corresponding spheres or portions of spheres as the one or more rings advance. Around the circumference of each of the rings can be printed a quantity of counting symbols that matches the quantity of holes or indentations corresponding to that ring. Printed on a base or an adjoining ring can be one or more indicia that enable a user to select, by rotation, one counting symbol on each ring. Inside the smallest ring can be an indicator hand or hand means, as might be found on a timepiece, that rotates around the axis independently of the rings and, when rotated, indicates a counting symbol on the circumference of the smallest ring. A hole or indentation in the hand can engage with spheres or portions of spheres in that portion of the base located inside the smallest ring. Likewise, a sphere or portion of a sphere in the hand can engage with holes or indentations in the base. Together, these components of a ball or pin detent or plunger, for example, can hold the hand in place when the hand is stationary and can engage one another when the hand is moved relative to the base beneath it. Like the rings and the adjoining base, the hand and the adjoining base can also engage one another using ratchet(s), pawl(s), gear(s), or click(s). Each component can also engage the other components using friction.

Accordingly, various embodiments can provide a counting apparatus for knitting that includes a plurality of concentric rings. The apparatus can include a first ring comprising a first outer diameter and a first inner diameter, which first ring can include a first plurality of counting symbols that are located on an upper surface of the first ring. A first indexer or indexing means can be used to rotatably position the first ring. The apparatus can also include a second ring comprising a second outer diameter and a second inner diameter that is equal to or greater than the first outer diameter. The second ring can be positioned concentrically about the first ring. Like the first ring, the second ring can include a second plurality of counting symbols on an upper surface of the second ring. A second indexer or indexing means can be used to rotatably position the second ring. Likewise, the apparatus can include a third ring as well as an indicator hand. Each of the rings and the hand can also be rotatably positioned using friction. Each ring can be coupled to one or more bases or base means by one or more retainers, such as brackets, screws, or tabs, or by portions of the base(s) or hand(s).

A plurality of counting symbols in any embodiment of the present invention can be affixed to one or more components of the apparatus, such as to one or more bases or one or more faces, and can comprise a continuous list of counting symbols. By way of example only, a first ring can include the following sequence of numerals and symbols: 0, 1, 2, 3, 4, 5, 6, 7, 8, 9, followed by two symbols. By way of further example, a second ring can include the following sequence of numerals: 0, 1, 2, 3, 4, 5, 6, 7, 8, 9, 10, 11, 12, 13, 14, 15, 16, 17, 18. By way of further example, a third ring can include the following sequence of numerals: 0, 1, 2, 3, 4, 5, 6, 7, 8, 9, 10, 11, 12, 13, 14, 15, 16, 17, 18, 19, 20, 21, 22, 23, 24. This arrangement of counting symbols on the faces permits a user to maintain two types of counts, as follows: (1) the first type of count using an indicator hand and the first ring, whereby the hand identifies a digit representing the tens column of a numeral and the first ring combines with a marking on the base to identify a digit representing the ones column of that numeral, or vice versa, for a minimum count of 0 and a maximum count of 99; and (2) the second type of count whereby the second and third rings, combined with marking(s) on the base(s), identify, respectively, one numeral in the range of 0 through 18, inclusive, and one numeral in the range of 0 through 24, inclusive. Of course, the embodiments of the present invention can use any suitable number of counting symbols. The plurality of counting symbols can be affixed, such as to a first, second, or third ring, for example, by at least one of printing, painting, etching, embossing, engraving, and stamping. In further embodiments, the plurality of counting symbols can correspond to a plurality of teeth of a ratchet wheel coupled to the ring or the base. For example, a ring with the numerals 0 through 18 affixed on an upper surface can comprise or be coupled to a ratchet wheel or ring on a lower surface that includes 19 teeth.

The base(s) of further embodiments can comprise one or more indicia that enable a user to select, by turning, a counting symbol on at least one of the first ring, the second ring, and the third ring, for example. In further embodiments, an indicator hand can be located within the first ring, wherein the indicator is rotatable to indicate a counting symbol on the first ring. A ratchet wheel and a pawl can be used to rotatably position the hand in any embodiment. For example, the ratchet wheel can be coupled to the hand and the pawl can be coupled to a base, for example. In the alternative, the pawl can be coupled to the hand and the ratchet wheel can be coupled to a base, for example. In yet another example, either the teeth of the ratchet or the pawl can be coupled to, or comprise, a post or post means. The hand can be coupled to a post or post means.

Other embodiments can provide a counting apparatus for knitting that includes a plurality of stacked rings that are not arranged concentrically in relation to each other. The apparatus can include a first ring, a second ring, and a third ring, for example, each of which can be rotatably positioned using an indexer or indexing means. The rings can also be rotatably positioned using friction. The outer and inner diameters of the rings can be, but need not be, equal to each other. One or more rings can include a plurality of counting symbols on its upper surface. Alternatively, or in addition, other face(s) and/or the base(s) of the apparatus can include a plurality of counting symbols to which one or more of the rings can refer by means of markings, knobs, protuberances, or other indicia in or on the ring(s), face(s), or base(s). The rings can be held in place by sandwiching them between the other face(s) and the base(s) or base means, which can be coupled to each other using one or more posts or post means. Alternatively, or in addition, the rings also can be held in place by sandwiching them between one or more hands and the base(s) or base means, which can be coupled to each other using one or more posts or post means.

By way of example only, a first ring having a first outer diameter can include the following sequence of numerals and symbols: 1, 2, 3, 4, 5, 6, 7, 8, 9, 0, 1, 2, 3, 4, 5, 6, 7, 8, 9, 0, followed by four symbols. By way of further example, a second ring having a second outer diameter greater than the first outer diameter can include the following sequence of numerals: 1, 2, 3, 4, 5, 6, 7, 8, 9, 10, 11, 12, 13, 14, 15, 16, 17, 18, 19, 20, 21, 22, 23, 24. By way of further example, a third ring having a third outer diameter greater than the first and second outer diameters can include the following sequence of numerals: 1, 2, 3, 4, 5, 6, 7, 8, 9, 10, 11, 12, 13, 14, 15, 16, 17, 18, 19, 20, 21, 22, 23, 24. The inner diameters of the rings can be equal to each other, with each inner diameter comprising a ratchet wheel that includes 24 teeth. This arrangement of counting symbols on the faces permits a user to maintain two types of counts, as follows: (1) the first type of count using an indicator hand and the first ring, whereby the hand identifies a digit representing the tens column of a numeral and the first ring combines with a marking on the base to identify a digit representing the ones column of that numeral, or vice versa, for a minimum count of 0 and a maximum count of 99; and (2) the second type of count whereby the second and third rings, combined with marking(s) on the base(s), identify one numeral in the range of 1 through 24, inclusive. Of course, the embodiments of the present invention can use any suitable number of counting symbols. The plurality of counting symbols can be affixed, such as to a first, second, or third ring, for example, by at least one of printing, painting, etching, embossing, engraving, and stamping.

The number of rings described herein is unlimited, although the more rings are included, the larger the counter may become. Similarly, the number of counting symbols described herein is unlimited, although the more counting symbols are included, the larger the counter may become. A counter of any size is possible, but the counter is preferably one that a user can hold in one or two hands.

Further embodiments of the present invention can comprise one or more dials and one or more rings. Any of the rings and dials described herein, along with their corresponding indexer or indexing means, can be used. Friction can also be used. By way of example only, the apparatus can include a dial, a first ring, a second ring, and a third ring, wherein each ring can be rotatably positioned in relation to the dial using an indexer or indexing means. In this example, the inner diameters of the rings can be equal to each other. Each inner diameter of each ring can comprise a ratchet wheel. Alternatively, each inner diameter of each ring can include detents that are designed to mate with a ball or pin comprising a sphere or portion of a sphere. Either the base or base means or the post or post means can comprise or house the ball or pin. The ball or pin can be stationary; alternatively, the ball or pin can be situated in a channel and activated by a spring. A plunger may comprise the ball or pin. Each ring can comprise a knob or protuberance that can indicate a counting symbol on the dial above it. The rings can be held in place by sandwiching them between the dial and the base or base means, which can be coupled to each other using a post or post means. Alternatively, or in addition, the rings can be held in place by sandwiching them between one or more hands and the base or base means, which can be coupled to each other using a post or post means.

The dial can include the following sequence of numerals: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, and 36. Thus, in this example, the inner diameter of each ring can comprise 36 teeth of a ratchet wheel or 36 detents. This arrangement of counting symbols on the dial permits a user to maintain three counts whereby the knob or protuberance on each ring identifies one numeral in the range of 1 through 36, inclusive. If the user wishes to indicate a count of zero, she can use a ring to indicate the number 36. Of course, the embodiments of the present invention can use any suitable number of counting symbols. The plurality of counting symbols can be affixed, such as to the dial, for example, by at least one of printing, painting, etching, embossing, engraving, and stamping.

Further embodiments can include a plurality of indicator hands affixed to a single axis, each of which can, but need not, rotate around the axis independently of the others. When the hands are stationary, indexers or indexing means such as ratchets, pawls, gears, clicks, detents, balls, pins, and plungers can hold the hand(s) in place. When one or more of the hands is rotated about the axis, the indexers or indexing means can permit the hand(s) to advance. A quantity of counting symbols can be printed around the circumference of the dial, ring, or base located underneath the plurality of rotatable hands, which quantity can match the quantity of ratchet teeth, gear teeth, clicks, detents, holes, indentations, balls, pins, spheres, portions of spheres, plungers, or other indexing features corresponding to that dial, ring, or base. The plurality of rotatable hands can also engage the dial, ring, or base underneath using friction. The apparatus can also contain a second, third, or fourth dial, each with one or more rotatable hands.

Accordingly, various embodiments can provide a counting apparatus for knitting that includes a plurality of rotatable indicator hands. The apparatus can include a dial affixed to or comprising a base, which dial or base can include a first plurality of counting symbols that are located on an upper surface of the dial or base. The apparatus can also include a first hand, which is affixed to the dial or base at its axis. A first indexer or indexing means can be used to rotatably position the first hand. The apparatus can also include a second hand which, like the first hand, is affixed to the dial or base at its axis. A second indexer or indexing means can be used to rotatably position the second hand. The apparatus can also include a second rotatable dial contained within the circumference of the first dial or base. Like the first dial or base, the second dial can include at least one rotatable hand that can be rotatably positioned using an indexer or indexing means. Each of the dials and hands also can be rotatably positioned using friction. As regards the indexer or indexing means, in one embodiment, for example, each hand can include a pawl, which can engage a ratchet wheel affixed to or comprising a post. Likewise, each hand can include a ratchet wheel that engages a pawl affixed to or comprising a post. In other embodiments, either the ratchet wheel or the pawl can be affixed to the dial or a base. Other embodiments can use other indexers or indexing means.

The number of teeth on a ratchet wheel can correspond to the number of symbols located on the corresponding face or base. By way of example only, the first dial or base can include the following sequence of numerals: 0, 1, 2, 3, 4, 5, 6, 7, 8, 9, 10, 11, 12, 13, 14, 15, 16, 17, 18, 19, 20, 21, 22, 23, 24, 25, 26, 27, 28. By way of further example, the second dial can be rotatable and can include the following sequence of numerals: 0, 1, 2, 3, 4, 5, 6, 7, 8, 9. This arrangement of numerals on the first dial or base and the second rotatable dial permits a user to maintain two types of counts, as follows: (1) the first type of count using the second rotatable dial and one indicator hand, whereby the rotatable dial identifies a digit representing the tens column of a numeral and the hand identifies a digit representing the ones column of that numeral, or vice versa, for a minimum count of 0 and a maximum count of 99; and (2) the second type of count using the first dial or base and three hands to identify three different numerals in the range of 0 through 30, inclusive. Of course, the embodiments of the present invention can use any suitable number of counting symbols. The plurality of symbols can be affixed, such as to a dial or base, for example, by at least one of printing, painting, etching, embossing, engraving, and stamping.

The number of hands described herein is unlimited, although the more hands are included, the more complex the counter may become. Similarly, the number of counting symbols described herein is unlimited, although the more counting symbols are included, the larger the counter may become. A counter of any size is possible, but the counter is preferably one that a user can hold in one or two hands.

In another embodiment of the present invention, the counter can be designed to accommodate one or more objects that fit either into or onto a surface or around an edge of the face(s) or base(s). An object can comprise a "tooth" or protuberance, for example, that can fit into one or more slots on a dial, ring, or base. The size, shape, and/or placement of these objects can correspond to the width of one counting symbol. These objects can act as "stops," informing the user that the repeat being counted has reached the beginning or the end of a count or has skipped a numeral as specified in the pattern. Stops can take the form of indicator hands, as on a timepiece.

Hands can function as stops. When not in use, these stops can be stored on a face or base. For example, stops can be stored over or adjacent to the symbols on a dial, ring, or base. The number of stops described herein is unlimited, although the more locations for storing stops are included, the larger the counter may become. Again, a counter of any size is possible, but the counter is preferably one that a user can hold in one or two hands.

The components of any embodiment of the present invention can be made from any suitable material, including plastics, metals, ceramics, organics, and any combination thereof. For example, the face, dial, ring, base, post, hand, stop, indexer, ratchet wheel, pawl, gear, click, detent, ball, pin, spring, or plunger can be made of or include one or more of plastic, aluminum, steel, brass, copper, nickel, tin, titanium, glass, ceramics, wood, carbon fiber, composite materials, and/or any combination thereof. Moreover, the material of any component can be plated, such as by nickel or chrome plating, and/or can be treated by nitriding (including ferritic nitrocarburizing) or carburizing. The plastic of any embodiment can comprise one or more of acrylic, acrylonitrile butadiene styrene ("ABS"), nylon, polypropylene, and DELRIN® acetal resin, for example, and can be formed by injection molding, milling, and/or 3D printing. The aluminum of any embodiment can be anodized in any suitable color.

As used herein, an indexer or indexing means includes, but is not limited to, a ratchet wheel or teeth and a pawl or pawl ring, a gear and a click, a ball or pin detent, a ball plunger, and/or combinations thereof. A post or post means can be used to align at or about an axis the one or more faces or hands in embodiments of the present invention. One or more posts or post means can "nest" around or within each other. As used herein, a post means includes, but is not limited to, those post structures shown and/or described herein and with respect to FIG. 1 through FIG. 6. As used herein, a base means includes, but is not limited to, those base structures shown and/or described with respect to FIG. 1 through FIG. 6. A retainer means includes, but is not limited to, those structures shown and/or described herein and with respect to FIGS. 2, 4, 5, and 6, including but not limited to brackets, screws, tabs, and a portion of a base or hand, that are used to retain a dial or ring.

Figure 1B:
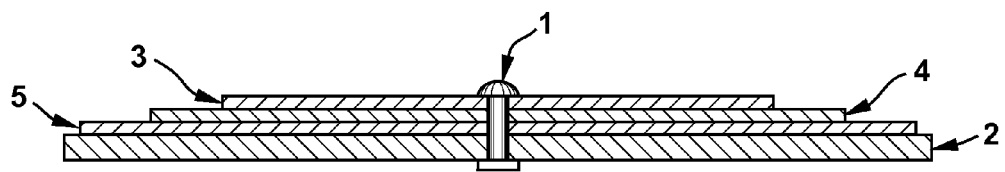
FIG. 1B depicts the embodiment in FIG. 1A from the side and cut in half along a diameter that begins at the 270° position and ends at the 90° position.

One embodiment of the invention as shown in FIG. 1A and FIG. 1B includes three faces or dials of varying diameters, which dials can rotate independently of each other around a single axis, through which a post (1) can connect the dials to a base (2). As concerns rotation around the axis, the dials can be held in place by friction. The circumference of the obverse or top of the first dial (3) can be printed with the numerals 1 through 16, inclusive. The circumference of the obverse or top of the second dial (4) can be printed with the numerals 1 through 18, inclusive. The circumference of the obverse or top of the third dial (5) can be printed with the numerals 1 through 24, inclusive. A user may select a counting symbol from each dial by rotating that dial until the selected counting symbol is aligned with a marking which, in this embodiment, comprises the apex of a handle (6), which is a component of or affixed to the base (2) at the 0° position.

FIG. 1B depicts the embodiment in FIG. 1A from the side and cut in half along a diameter that begins at the 270° position and ends at the 90° position.

Figure 2A:
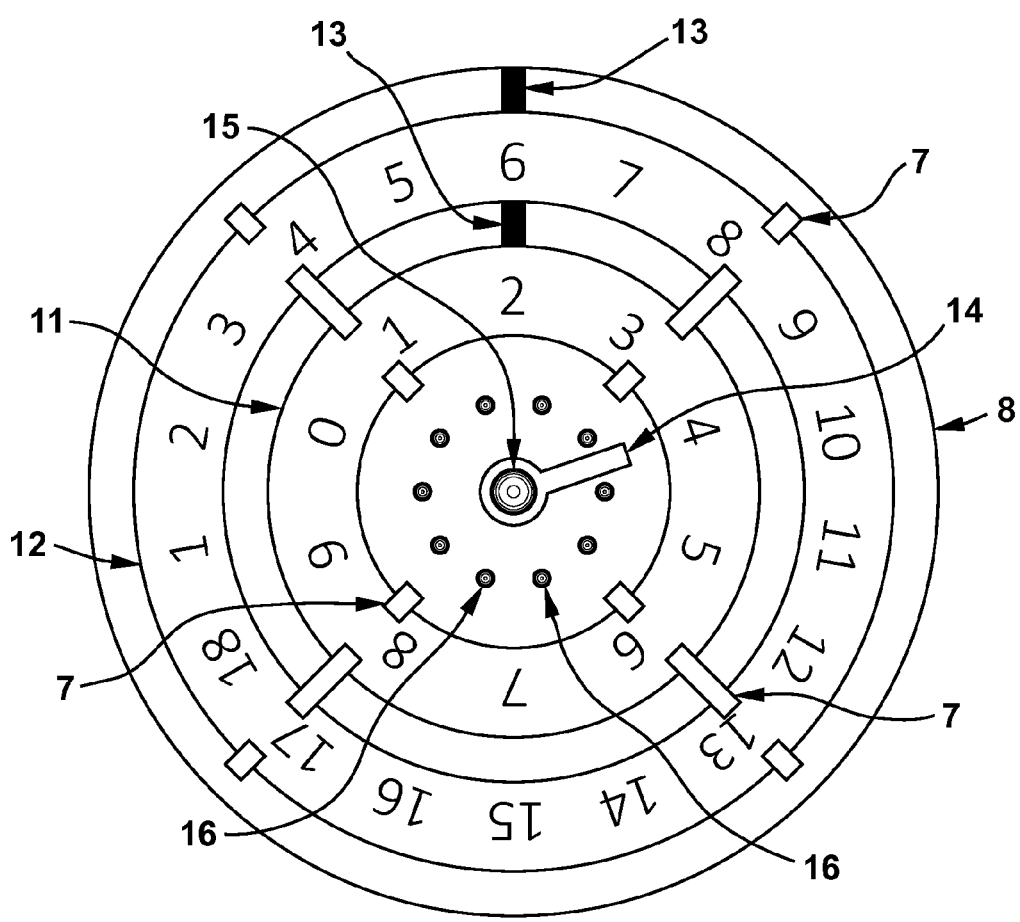
FIG. 2A shows, from the top, an apparatus of one embodiment of the present invention including two rings and a hand.
Figure 2B:
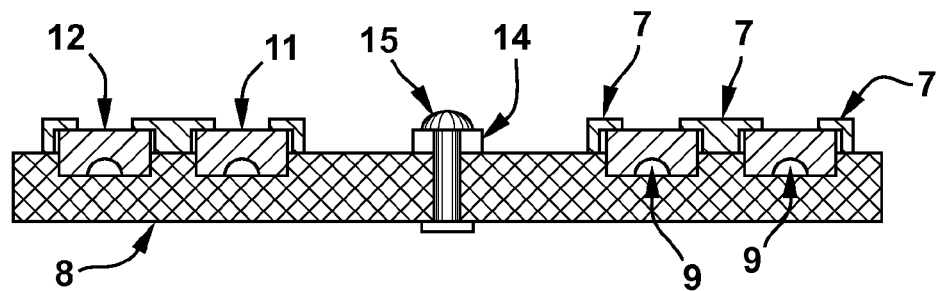
FIG. 2B depicts the embodiment in FIG. 2A from the side and cut in half along a diameter that begins at the 225° position and ends at the 45° position.
Figure 2C:
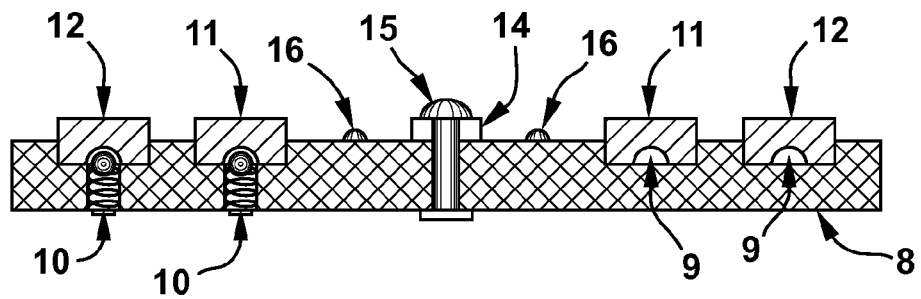
FIG. 2C depicts the embodiment in FIG. 2A from the side and cut in half along a diameter that begins at the 270° position and ends at the 90° position.

The embodiment of the invention shown in FIG. 2A, FIG. 2B, and FIG. 2C includes two faces or rings of varying diameters, which rings can rotate independently of each other around a single axis. One or more retainers, such as, but not limited to, brackets (7), can connect a ring to a base (8), into which the ring is seated, by exerting downward pressure on, or retaining, the upper surface of the ring, in any embodiment of the present invention. As concerns rotation around the axis, the rings can be held in place by two ball detents as follows: the reverse or underside of each ring can include detents or concave indentations (9) located underneath each counting symbol; and a ball plunger (10) can be a component of or affixed to the obverse or top of the base (8) underneath each ring. Each ball plunger (10) can be located so as to engage the detents or concave indentations (9) in the reverse or underside of the corresponding ring when that ring is rotated around the axis.

The circumference of the obverse or top of the inner ring (11) can be printed with the numerals 0 through 9, inclusive; the reverse or underside of the inner ring can include 10 detents or concave indentations (9). The circumference of the obverse or top of the outer ring (12) can be printed with the numerals 1 through 18, inclusive; the reverse or underside of the inner ring can include 18 detents or concave indentations (9). A user may select a counting symbol from each ring by rotating that ring until the selected counting symbol is aligned with a marking (13). In this embodiment, each ring can have a corresponding marking (13), which appears as a symbol printed on the obverse or top of the base (8) at the 0° position.

The embodiment of the invention shown in FIG. 2A, FIG. 2B, and FIG. 2C includes an indicator hand (14), as might be found on a timepiece, that rotates around the axis independently of the rings and, when rotated, indicates a counting symbol on the circumference of the inner ring (11). A post (15) can connect the hand (14) to the base (8) at the axis. As concerns rotation around the axis, the hand (14) can be held in place by ten "clicks" (16) that protrude from and are components of or affixed to the obverse or top of the base (8). Each click (16) can be located on a radius that bisects the arc connecting two neighboring counting symbols on the circumference of the inner ring (11). A user may use the hand (14) to select a counting symbol from the circumference of the inner ring (11) by rotating the hand (14) past the clicks (16) until the hand (14) indicates the selected counting symbol.

FIG. 2B depicts the embodiment in FIG. 2A from the side and cut in half along a diameter that begins at the 225° position and ends at the 45° position. Brackets (7) connecting the rings to the base (8) are located along this diameter.

FIG. 2C depicts the embodiment in FIG. 2A from the side and cut in half along a diameter that begins at the 270° position and ends at the 90° position. Ball plungers (10) and clicks (16) are located along this diameter.

Figure 3A:
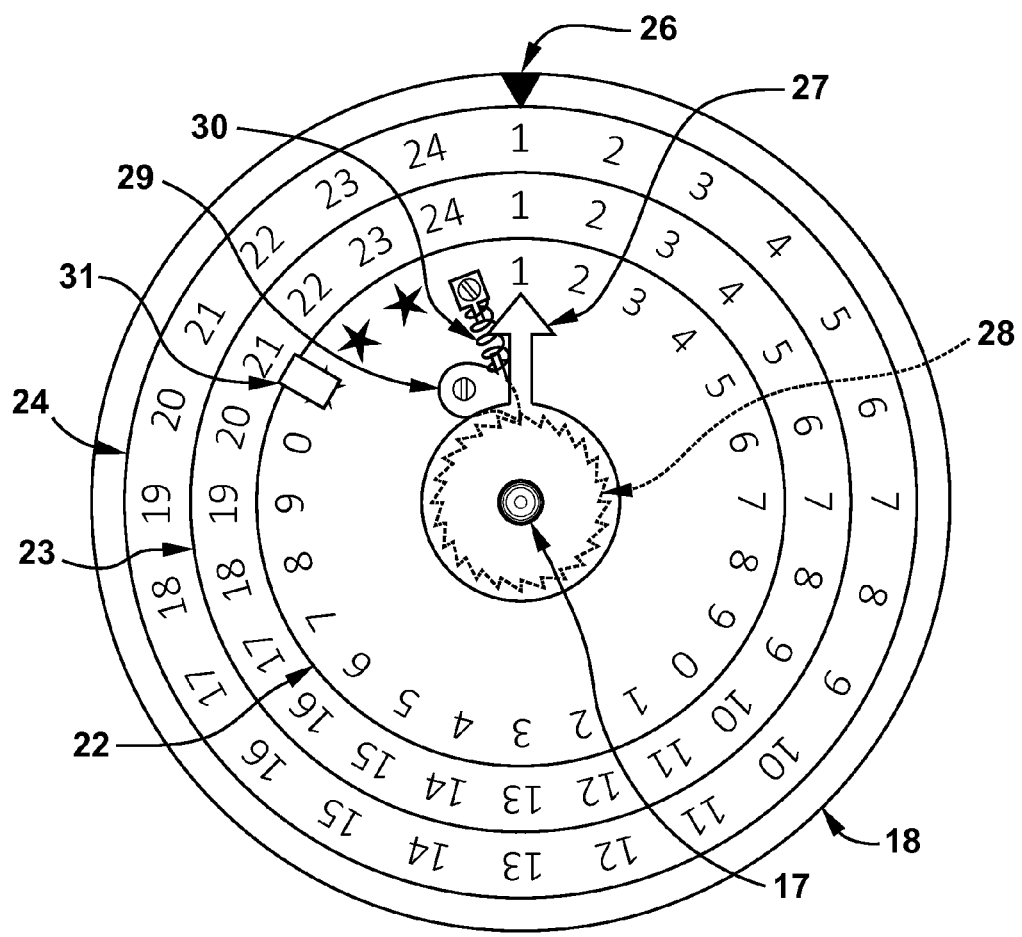
FIG. 3A shows, from the top, an apparatus of one embodiment of the present invention including three dials, a hand, and a stop.
Figure 3B:
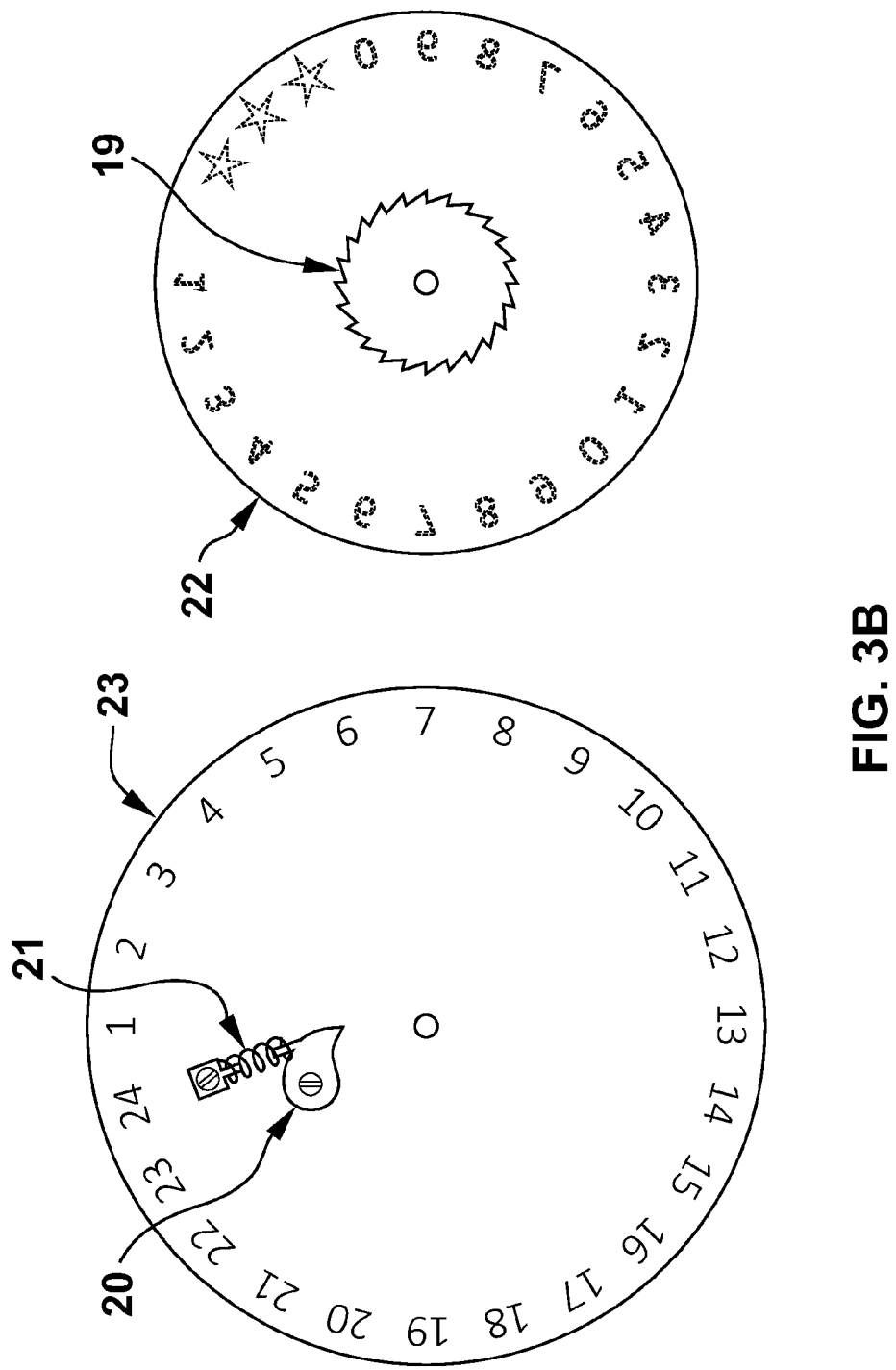
FIG. 3B depicts two adjoining dials of the embodiment in FIG. 3A, one (on the left) as viewed from the top, and one (on the right) as viewed from the underside.
Figure 3C:
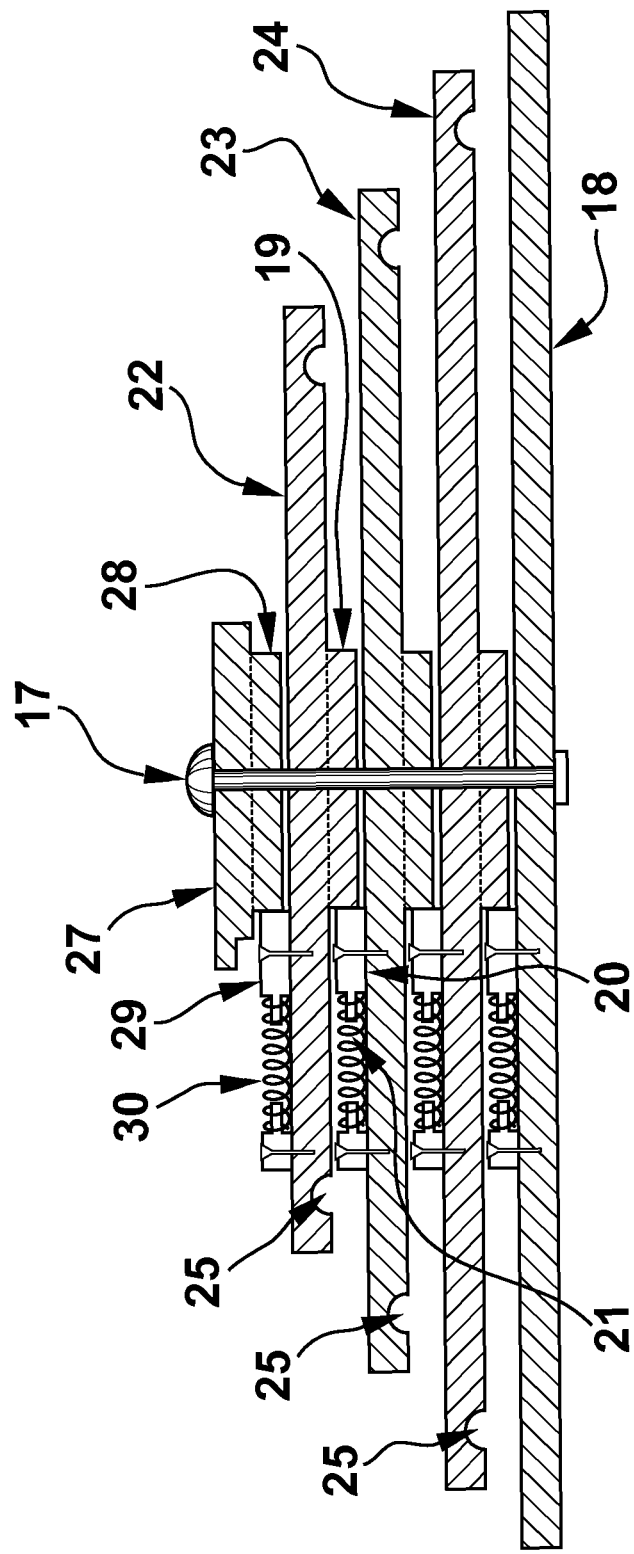
FIG. 3C depicts the embodiment in FIG. 3A from the side and cut in half along a diameter that begins at the 345° position and ends at the 165° position.

The embodiment of the invention shown in FIG. 3A, FIG. 3B, and FIG. 3C includes three faces or dials of varying diameters, which dials can rotate independently of each other around a single axis, through which a post (17) connects the dials to a base (18). As concerns rotation around the axis, the dials can be held in place by three ratchet wheels and three pawls as follows: a ratchet wheel (19) is a component of or is affixed to the reverse or underside of the each of the dials; and a pawl (20), loaded with a spring (21), is a component of or is affixed to the obverse or top of the second dial (23), the obverse or top of the third dial (24), and the obverse or top of the base (18). Each pawl can be located so as to engage the teeth of its corresponding ratchet wheel when the dial of which the ratchet wheel is a component or to which the ratchet wheel is affixed is rotated around the axis.

The circumference of the obverse or top of the first dial (22) can be printed with the numerals 1 through 0, inclusive, followed by 1 through 0, inclusive, followed by three symbols, for a total of 23 counting symbols. The circumference of the obverse or top of each of the second dial (23) and the third dial (24) can be printed with the numerals 1 through 24, inclusive. The reverse or underside of each dial can include detents or concave indentations (25) located underneath each counting symbol. A user may select a counting symbol from each dial by rotating that dial until the selected counting symbol is aligned with a marking (26) which, in this embodiment, appears as a symbol printed on the obverse or top of the base (18) at the 0° position.

The embodiment of the invention in FIG. 3A, FIG. 3B, and FIG. 3C also includes a hand (27) that can rotate around the axis independently of the dials and, when rotated, can indicate a counting symbol on the circumference of the first dial (22). A post (17) can connect the hand (27) to the dials and the base (18) at the axis. As concerns rotation around the axis, the hand (27) can be held in place by a ratchet wheel and a pawl as follows: a ratchet wheel (28) can be a component of or affixed to the reverse or underside of the hand (27); and a pawl (29), loaded with a spring (30), can be a component of or affixed to the obverse or top of the first dial (22). The pawl (29) can be located so as to engage the teeth of the ratchet wheel (28) corresponding to the hand (27) when the hand (27) is rotated around the axis. A user may use the hand (27) to select a counting symbol from the circumference of the first dial (22) by rotating the hand (27) until the hand (27) indicates the selected counting symbol.

The embodiment of the invention in FIG. 3A, FIG. 3B, and FIG. 3C also includes at least one stop (31) consisting of an object that can be placed over or adjacent to a counting symbol to indicate a count at, before, or after which the user should take an action. The size, shape, and/or placement of each stop (31) enables it to wrap from the obverse or top around the edge to the reverse or underside of each dial and to partially or wholly conceal the counting symbol underneath. The stop (31) can be held in place, in part, by a protuberance that fits within a detent or concave indentation (25) located underneath each counting symbol on each dial. In this embodiment, a stop (31) is being stored over a counting symbol on the first dial (22) until the stop is needed by the user.

FIG. 3B depicts the first dial (22) and the second dial (23) of the embodiment in FIG. 3A. The second dial (23) is shown from the obverse or top, so as to reveal the pawl (20) and its corresponding spring (21). The first dial (22) is shown from the reverse or underside, so as to reveal the corresponding ratchet wheel (19).

FIG. 3C depicts the embodiment in FIG. 3A from the side and cut in half along a diameter that begins at the 345° position and ends at the 165° position. Pawls (20), their corresponding springs (21), and detents or concave indentations (25) are located along this diameter.

Figure 3D:
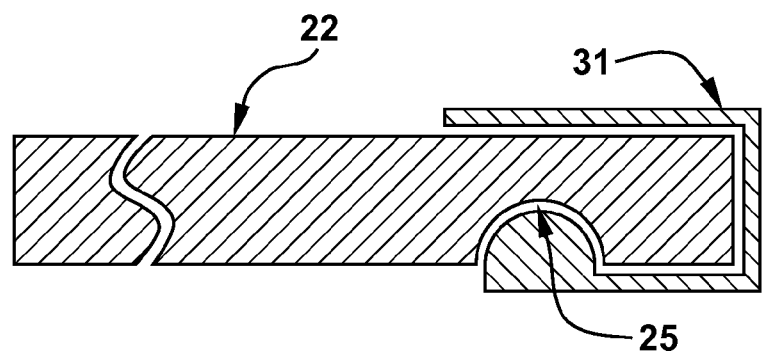
FIG. 3D depicts the edge of a dial of the embodiment in FIG. 3A, which dial is shown from the side and cut in half along a diameter that ends at the 300° position.

FIG. 3D depicts the edge of the first dial (22) of the embodiment in FIG. 3A, which first dial (22) is shown from the side and cut in half along a diameter that ends at the 300° position. A stop (31) is placed over a counting symbol at this position.

Figure 4A:
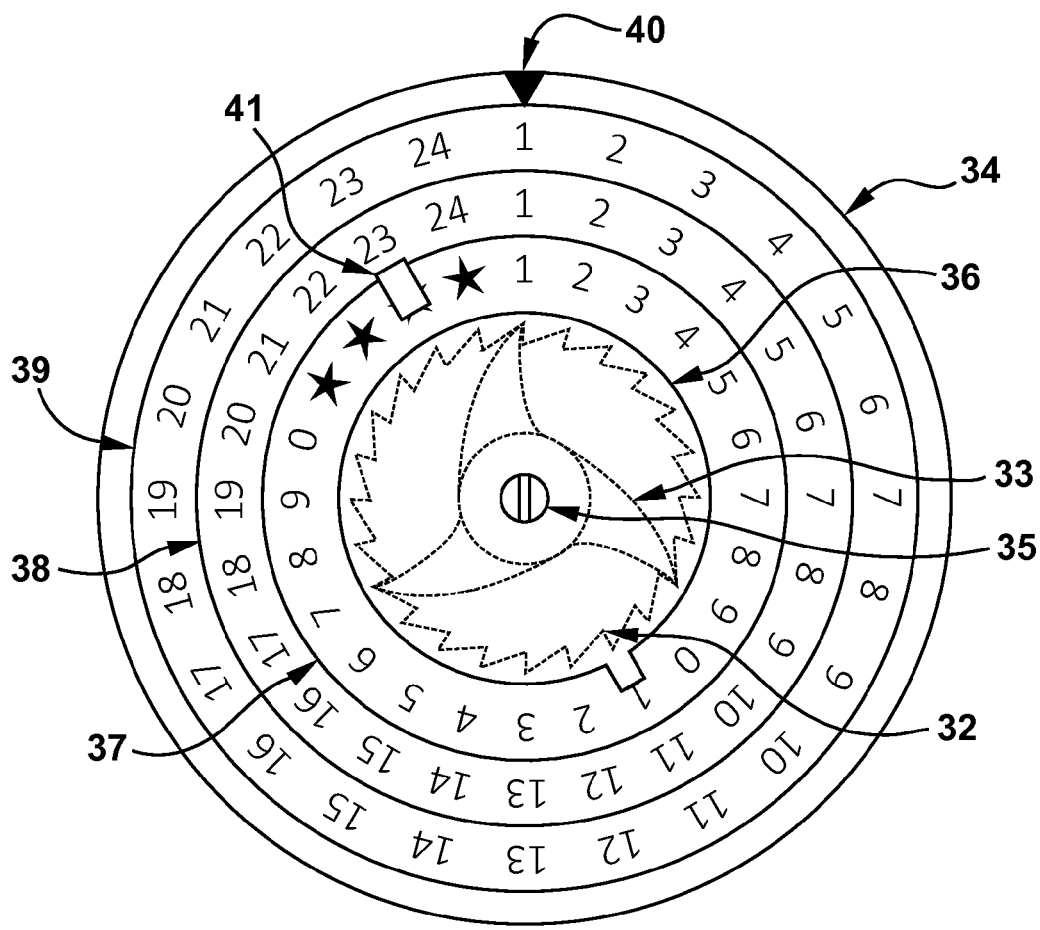
FIG. 4A shows, from the top, an apparatus of one embodiment of the present invention including three rings, a hand, and a stop.
Figure 4B:
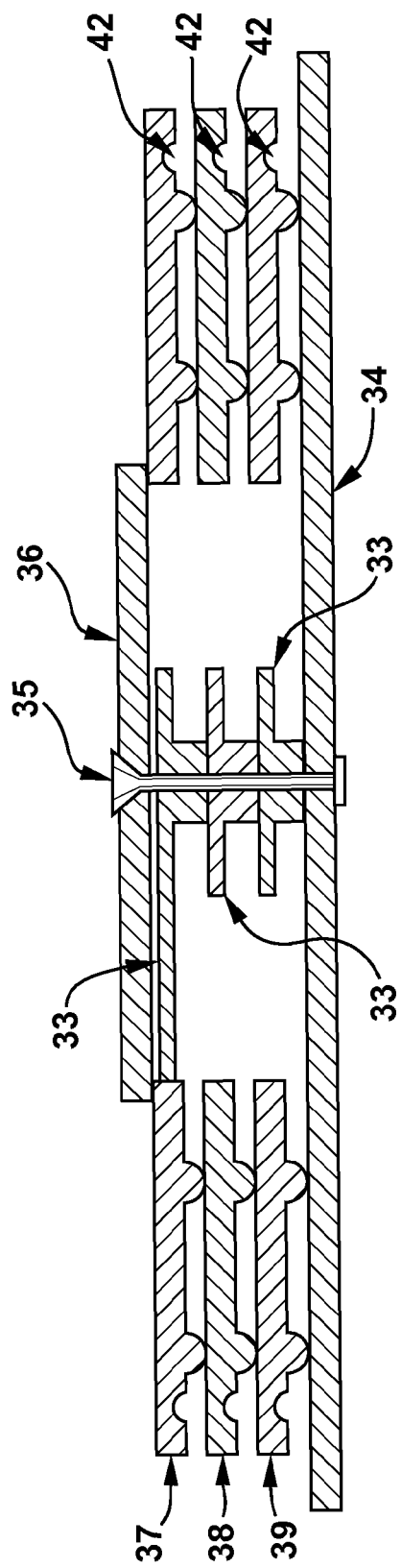
FIG. 4B depicts the embodiment in FIG. 4A from the side and cut in half along a diameter that begins at the 0° position and ends at the 180° position.

The embodiment of the invention shown in FIG. 4A and FIG. 4B includes three faces or rings of varying outer diameters but identical inner diameters, which rings can rotate independently of each other around a single axis. As concerns rotation around the axis, the rings can be held in place by three ratchet wheels and three pawls as follows: the inner diameter of each ring can comprise the teeth of a ratchet wheel (32); and a pawl (33) corresponding to each ring can be connected to the base (34) at the axis by a post (35). Each pawl (33) can be located so as to engage the teeth of its corresponding ratchet wheel when each ring is rotated around the axis. The rings can be held in place against the base by a hand (36) connected to the post (35). The hand (36) can rotate around the axis independently of the rings and, when rotated, can indicate a counting symbol on the circumference of the first ring (37). A post (35) can connect the hand (36) to the base (34) at the axis. As concerns rotation around the axis, the hand (36) can be held in place by friction.

The circumference of the obverse or top of the first ring (37) can be printed with the numerals 1 through 0, inclusive, followed by 1 through 0, inclusive, followed by four symbols, for a total of 24 counting symbols. The circumference of the obverse or top of each of the second ring (38) and the third ring (39) can be printed with the numerals 1 through 24, inclusive. A user may select a counting symbol from each ring by rotating that ring until the selected counting symbol is aligned with a marking (40) which, in this embodiment, appears as a symbol printed on the obverse or top of the base (34) at the 0° position.

The embodiment of the invention in FIG. 4A and FIG. 4B also includes at least one stop (41) consisting of an object that can be placed over or adjacent to a counting symbol to indicate a count at, before, or after which the user should take an action. The size, shape, and/or placement of each stop (41) enables it to wrap from the obverse or top around the edge to the reverse or underside of each ring and to partially or wholly conceal the counting symbol underneath. The stop (41) can be held in place, in part, by a protuberance that can fit within a detent or concave indentation (42) located underneath each counting symbol on each ring. In this embodiment, a stop (41) is being stored over a counting symbol on the first ring (37) until the stop is needed by the user.

Figure 5A:
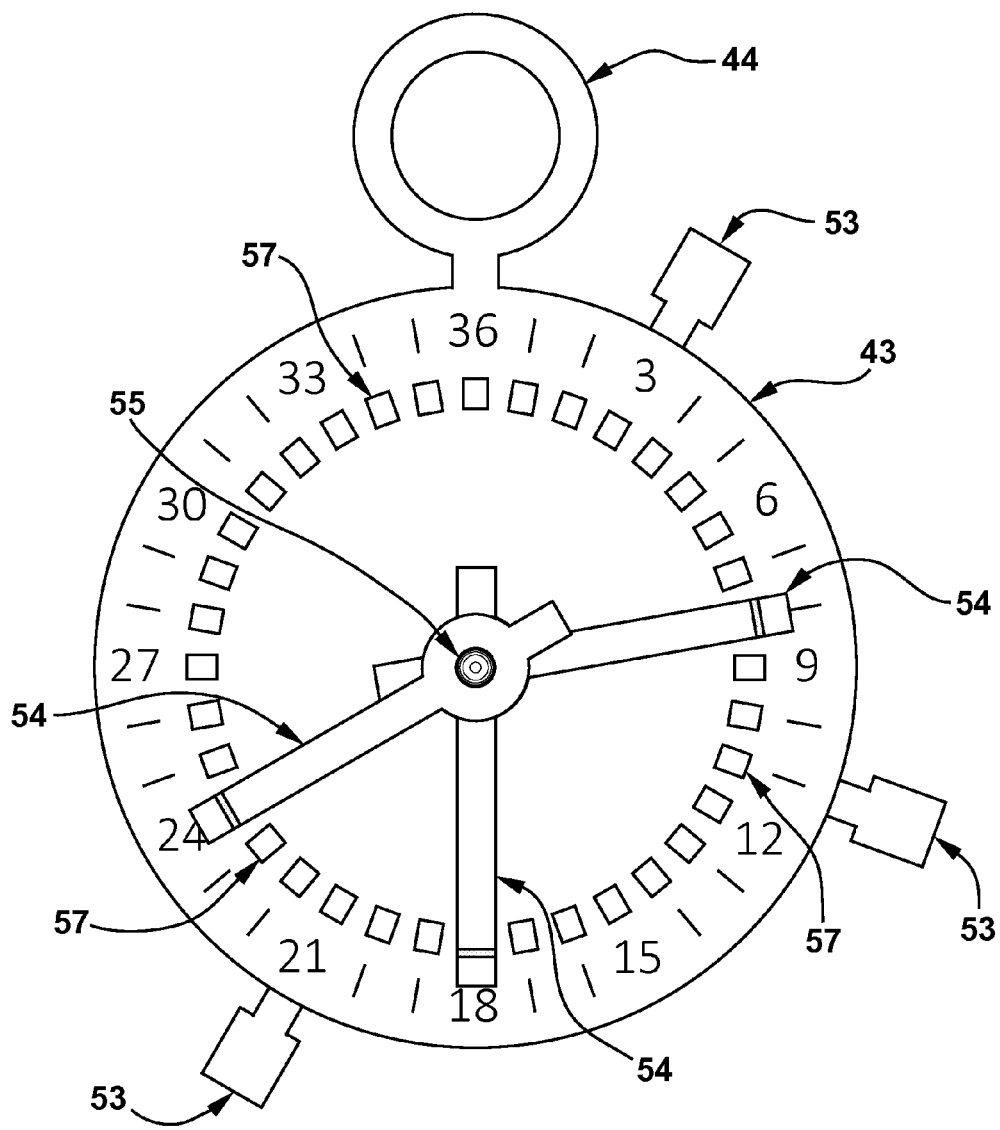
FIG. 5A shows, from the top, an apparatus of one embodiment of the present invention including a dial, three rings, and three stops in the shape of hands.
Figure 5B:
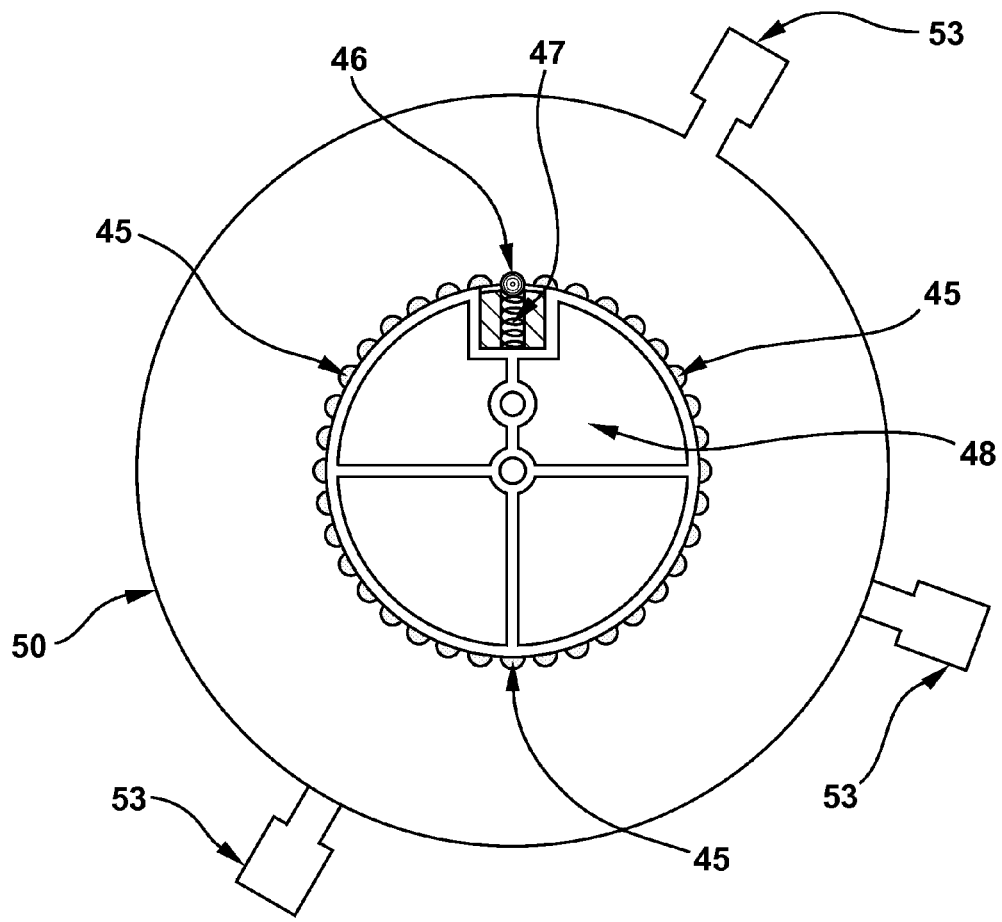
FIG. 5B depicts the embodiment in FIG. 5A from the top and omitting the dial so as to reveal the apparatus underneath.

The embodiment of the invention shown in FIG. 5A, FIG. 5B, and FIG. 5C includes a face or dial (43) and three faces or rings of varying diameters, which rings can rotate independently of each other around a single axis. The circumference of the obverse or top of the dial (43) can be printed with the numerals 3, 6, 9, 12, 15, 18, 21, 24, 27, 30, 33, and 36, inclusive, with symbols marking the intervals between the numerals, as on a timepiece, as follows: symbol, symbol, 3, symbol, symbol, 6, symbol, symbol, 9, symbol, symbol, 12, symbol, symbol, 15, symbol, symbol, 18, symbol, symbol, 21, symbol, symbol, 24, symbol, symbol, 27, symbol, symbol, 30, symbol, symbol, 33, symbol, symbol, and 36. The counting symbols can total 36. In this embodiment, the dial (43) includes a handle (44) resembling the bow of a pocket watch, which handle (44) is a component of or affixed to the dial (43) at the 0° position.

As concerns rotation around the axis, the rings can be held in place by three ball detents as follows: the inner diameter of each ring can include detents or concave indentations (45) in a number that equals the number of counting symbols on the dial (43), here, 36; and a ball (46) and spring (47) corresponding to each ring can be a component of the base (48) and can be located so as to engage the detents or concave indentations (45) in the inner diameter of each ring when that ring is rotated around the axis. The rings can be held in place by the dial (43) above and the base (48) beneath. The dial (43) and the base (48) can be coupled to a first post (49).

Each of the first ring (50), the second ring (51), and the third ring (52) can comprise a knob or protuberance (53) along its outer diameter, which knob or protuberance (53) can indicate a counting symbol on the dial (43), above, when the ring of which it is a part is rotated around the axis. Thus, a user may select a counting symbol from the dial (43) by rotating a ring until a knob or protuberance (53) of a ring is underneath and alongside the selected counting symbol. In this embodiment, the three knobs or protuberances (53) are being used to indicate the numerals 3 and 21 and a symbol that indicates the number 11.

The embodiment of the invention in FIG. 5A, FIG. 5B, and FIG. 5C also includes three indicator hands (54) that can rotate around the axis independently of the rings and, when rotated, can indicate a counting symbol on the circumference of the dial (43). A second post (55) can connect the hands (54) to the base (48) at the axis. In this embodiment, the hands (54) function as stops, or objects that can be located adjacent to a counting symbol to indicate a count at, before, or after which the user should take an action. Each hand (54) can comprise a protruding "tooth" (56) underneath the end of the hand (54) that is closer to the counting symbols. The shape of each tooth (56) enables it to fit within a slot (57) on the dial (43) alongside a counting symbol. The tooth (56) can be held in place within the slot (57) by friction. In this embodiment, the three hands (54) are being used to indicate the numerals 18 and 24 and a symbol that indicates the number 8. The end of each hand (54) that is closer to the counting symbols can comprise an angle so as to permit the user more easily to disengage the hand (54) from the dial (43).

FIG. 5B depicts the embodiment in FIG. 5A from the top and omits the dial (43) to reveal the first ring (50), the detents or concave indentations (45) along its inner diameter, the ball (46) and spring (47) corresponding to the first ring (50), and the knobs or protuberances (53) comprising parts of the first ring (50), the second ring (51), and the third ring (52).

FIG. 5C depicts the embodiment in FIG. 5A from the side and cut in half along a diameter that begins at the 180° position and ends at the 0° position. The handle (44), the balls (46) and springs (47) corresponding to the three rings, the first post (49), the second post (55), a hand (54) with its tooth (56), and two slots (57) are located along this diameter. The tooth (56) is located within the slot (57) at the 180° position, indicating the numeral 18.

Figure 6:
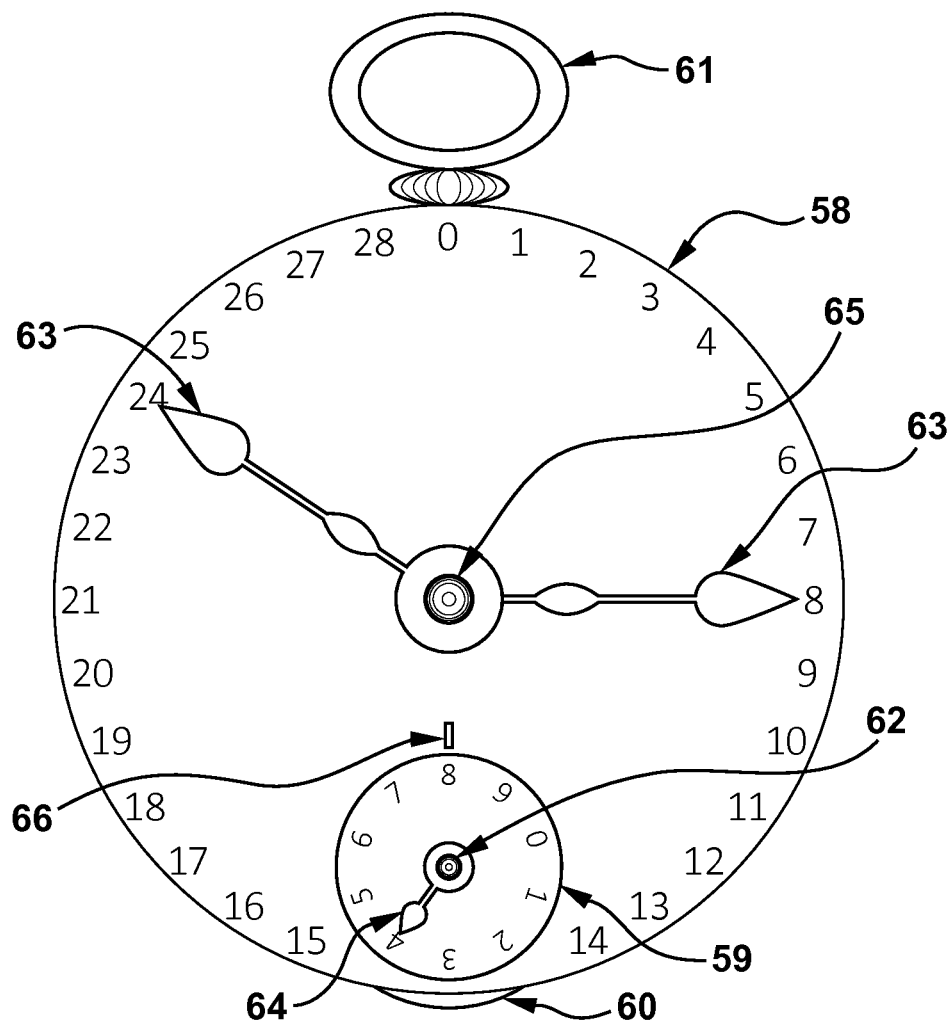
FIG. 6 shows, from the top, an apparatus of one embodiment of the present invention including three dials and three hands.

The embodiment of the invention in FIG. 6 can include three faces or dials of varying diameters. In this embodiment, the second dial (59) and the third dial (60) are coaxial; the first dial (58) is not. The first dial (58) can include a handle (61) resembling the bow of a pocket watch, which handle (61) can be a component of or affixed to the first dial (58) at the 0° position. The second dial (59) can be located on the obverse or top of the first dial (58) and can rotate around a second axis located between the first axis and the circumference of the first dial (58) at the 180° position. The second dial (59) can be held in place by means of a second post (62) that can couple the second dial (59) to the first dial (58) and then to the third dial (60) underneath. All or part of the second post (62) can comprise a rectangular cuboid or be otherwise shaped so as to force the second dial (59) to rotate when the user rotates that part of the third dial (60) that protrudes from beneath the circumference of the first dial (58). As concerns rotation around the second axis, the second dial (59) and the third dial (60) can be held in place by friction.

The embodiment of the invention in FIG. 6 also includes three hands, as follows: the first two hands (63) can rotate around the first axis independently of each other and, when rotated, can indicate a counting symbol on the circumference of the first dial (58); and the third hand (64) can rotate around the second axis and, when rotated, can indicate a counting symbol on the circumference of the second dial (59). A first post (65) can couple the first two hands (63) to the first dial (58) at the first axis. The second post (62) can couple the third hand (64) to the first dial (58) and the third dial (60) at the second axis.

The circumference of the obverse or top of the first dial (58) can be printed with the numerals 0 through 28, inclusive. The circumference of the obverse or top of the second dial (59) can be printed with the numerals 0 through 9, inclusive. This arrangement of counting symbols on the first dial (58) and second dial (59) permits a user to maintain two types of counts, as follows: (1) the first type of count using the third hand (64) and the second dial (59), whereby the third hand (64) identifies a digit representing the tens column of a numeral and the second dial (59) combines with a marking or other indicium (66) on the first dial (58) to identify a digit representing the ones column of that numeral, or vice versa, for a minimum count of 0 and a maximum count of 99; and (2) the second type of count whereby the first two hands (63) indicate two numerals in the range of 0 through 28, inclusive.

While the invention has been described in detail in connection with specific embodiments, the invention should not be understood as limited to those embodiments. Instead, the invention can be modified to incorporate any number of modifications, substitutions, or equivalent arrangements that are not described herein but are commensurate with the spirit and scope of the invention. Specific embodiments should be taken as exemplary and not limiting.

I claim:

1. A counting apparatus for knitting that includes a plurality of faces, the apparatus comprising:
   a. a first face including a first plurality of counting symbols numbering at least eleven;
   b. a second face that can be rotatably positioned with respect to the first face to indicate a first count;
   c. a third face that can be rotatably positioned with respect to the first face to indicate a second count; and
   d. a base that secures the first face, the second face, and the third face.

2. The apparatus of claim 1, further comprising:
   a. a second indexer that rotatably positions the second face with respect to the first face; and
   b. a third indexer that rotatably positions the third face with respect to the first face.

3. The apparatus of claim 2, wherein the second indexer comprises a ball or ball plunger and a plurality of corresponding detents.

4. The apparatus of claim 3, wherein the first plurality of counting symbols correspond to the plurality of detents.

5. The apparatus of claim 2, wherein the second indexer comprises a ratchet wheel that engages a pawl.

6. The apparatus of claim 5, wherein the first plurality of counting symbols correspond to a plurality of teeth of the ratchet wheel.

7. The apparatus of claim 1, further comprising a post that coaxially aligns the first face and at least one of the second face and the third face.

8. The apparatus of claim 1, wherein the base coaxially aligns the first face and at least one of the second face and the third face.

9. The apparatus of claim 1, wherein the base includes one or more markings, knobs, protuberances, or other indicia that enable a user to select, by turning, one of the first plurality of counting symbols on the first face.

10. The apparatus of claim 1, wherein at least one of the second face and the third face includes one or more markings, knobs, protuberances, or other indicia that enable a user to select, by turning, a counting symbol on the first face.

11. The apparatus of claim 1, further comprising an indicator that is located above or below the first face, wherein the indicator is rotatable to indicate one of the first plurality of counting symbols on the first face.

12. The apparatus of claim 11, wherein the indicator is coupled to a post.

13. The apparatus of claim 1, further comprising a fourth face that can be rotatably positioned with respect to the first face to indicate a third count, wherein the fourth face is secured by the base.

14. The apparatus of claim 13, further comprising a fourth indexer that rotatably positions the fourth face with respect to the first face.

15. The apparatus of claim 1, wherein one or more objects fit into or onto a surface or around an edge of at least one of the first face, the second face, and the base.

16. The apparatus of claim 15, wherein at least one edge of the object corresponds to the length or width of one counting symbol.

17. The apparatus of claim 1, wherein the first face, the second face, and the third face are substantially circular.

18. The apparatus of claim 1, wherein each of the second face and the third face comprise a ring.

19. The apparatus of claim 1, wherein each of the second face and the third face comprise a dial.

20. A counting apparatus for knitting that includes a plurality of faces, the apparatus comprising:
   a. a base for securing the plurality of faces;
   b. a first face including a first plurality of counting symbols numbering at least eleven, wherein the first face can be rotatably positioned with respect to the base to indicate a first count;
   c. a second face including a second plurality of counting symbols numbering at least eleven, wherein the second face can be rotatably positioned with respect to the base to indicate a second count;
   d. a first indexer that rotatably positions the first face with respect to the base; and
   e. a second indexer that rotatably positions the second face with respect to the base, and wherein at least one of the first indexer and the second indexer comprises a ratchet wheel that engages a pawl.

21. A counting apparatus for knitting that includes a plurality of faces, the apparatus comprising:
   a. a base for securing the plurality of faces;
   b. a first face including a first plurality of counting symbols numbering at least eleven, wherein the first face can be rotatably positioned with respect to the base to indicate a first count;
   c. a second face including a second plurality of counting symbols numbering at least eleven, wherein the second face can be rotatably positioned with respect to the base to indicate a second count;
   d. a first indexer that rotatably positions the first face with respect to the base; and
   e. a second indexer that rotatably positions the second face with respect to the base, and wherein the first indexer comprises a plurality of teeth of a ratchet wheel that correspond to the first plurality of counting symbols.

22. A counting apparatus for knitting that includes a plurality of faces, the apparatus comprising:
   a. a base for securing the plurality of faces;
   b. a first face including a first plurality of counting symbols numbering at least eleven, wherein the first face can be rotatably positioned with respect to the base to indicate a first count;
   c. a second face including a second plurality of counting symbols numbering at least eleven, wherein the second face can be rotatably positioned with respect to the base to indicate a second count; and d. an indicator that is located above or below the first face, and wherein the indicator is rotatable to indicate a counting symbol on at least one of the first face and the second face.

23. The apparatus of claim 22, wherein the indicator is coupled to a post.

24. The apparatus of claim 22, wherein the indicator is coupled to one of the first face and the second face.

25. A counting apparatus for knitting that includes a plurality of faces, the apparatus comprising:
   a. a base for securing the plurality of faces;
   b. a first face including a first plurality of counting symbols numbering at least eleven, wherein the first face can be rotatably positioned with respect to the base to indicate a first count;
   c. a second face including a second plurality of counting symbols numbering at least eleven, wherein the second face can be rotatably positioned with respect to the base to indicate a second count;
   d. a third face including a third plurality of counting symbols numbering at least eleven, wherein the third face can be rotatably positioned with respect to the base to indicate a third count; and
   e. a third indexer to rotatably position the third face with respect to the base.

26. A counting apparatus for knitting that includes a plurality of faces, the apparatus comprising:
   a. a base for securing the plurality of faces;
   b. a first face including a first plurality of counting symbols numbering at least eleven, wherein the first face can be rotatably positioned with respect to the base to indicate a first count;
   c. a second face including a second plurality of counting symbols numbering at least eleven, wherein the second face can be rotatably positioned with respect to the base to indicate a second count, and wherein one or more objects fit into or onto a surface or around an edge of at least one of the first face, the second face, and the base.

27. The apparatus of claim 26, wherein at least one edge of the object corresponds to the length or width of one counting symbol.

28. A counting apparatus for knitting that includes a plurality of faces, the apparatus comprising:
   a. a first face means including a first plurality of counting symbols numbering at least eleven;
   b. a second face means that can be rotatably positioned with respect to the first face means to indicate a first count;
   c. a third face means that can be rotatably positioned with respect to the first face means to indicate a second count; and
   d. a base means that secures the first face means, the second face means, and the third face means.

29. The apparatus of claim 28, further comprising:
   a. a second indexing means that rotatably positions the second face means with respect to the first face means; and
   b. a third indexing means that rotatably positions the third face means with respect to the first face means.

30. A counting apparatus for knitting that includes a plurality of faces, the apparatus comprising:
   a. a first face including a first plurality of counting symbols numbering at least eleven;
   b. a second face that can be rotatably positioned with respect to the first face to indicate a first count;
   c. a third face that can be rotatably positioned with respect to the first face to indicate a second count;
   d. a fourth face that can be rotatably positioned with respect to the first face to indicate a third count, and wherein at least one of the second face, the third face, and the fourth face includes one or more markings, knobs, protuberances, or other indicia that enable a user to select, by turning, one of the first plurality of counting symbols on the first face;
   e. a second indexer that rotatably positions the second face with respect to the first face;
   f. a third indexer that rotatably positions the third face with respect to the first face;
   g. a fourth indexer that rotatably positions the fourth face with respect to the first face;
   h. a first indicator that is located above the first face, wherein the first indicator is rotatable to indicate one of the first plurality of counting symbols on the first face;
   i. a second indicator that is located above the first face, wherein the second indicator is rotatable to indicate one of the first plurality of counting symbols on the first face;
   j. a third indicator that is located above the first face, wherein the third indicator is rotatable to indicate one of the first plurality of counting symbols on the first face; and
   k. a base that secures the first face, the second face, the third face, and the fourth face, and wherein at least one of a post or the base coaxially aligns the first face, the second face, the third face, and the fourth face.

31. The apparatus of claim 30, wherein each of the second indexer, the third indexer, and the fourth indexer comprise a ball or ball plunger and a plurality of detents that correspond to the first plurality of counting symbols.

32. The apparatus of claim 30, wherein each of the second indexer, the third indexer, and the fourth indexer comprise a pawl and a ratchet wheel with a number of teeth that corresponds to the first plurality of counting symbols.

33. The apparatus of claim 30, wherein each of the second face, the third face, and the fourth face comprise a dial.

34. The apparatus of claim 30, wherein each of the second face, the third face, and the fourth face comprise a ring.

35. The apparatus of claim 34, wherein each of the second indexer, the third indexer, and the fourth indexer comprise a ball or ball plunger and a plurality of detents that correspond to the first plurality of counting symbols.

36. A counting apparatus for knitting that includes a plurality of faces, the apparatus comprising:
   a. a first face means including a first plurality of counting symbols numbering at least eleven;
   b. a second face means that can be rotatably positioned with respect to the first face means to indicate a first count;
   c. a third face means that can be rotatably positioned with respect to the first face means to indicate a second count;
   d. a fourth face means that can be rotatably positioned with respect to the first face means to indicate a third count, and wherein at least one of the second face means, the third face means, and the fourth face means includes one or more markings, knobs, protuberances, or other indicia that enable a user to select, by turning, one of the first plurality of counting symbols on the first face means;
   e. a second indexing means that rotatably positions the second face means with respect to the first face means;
   f. a third indexing means that rotatably positions the third face means with respect to the first face means;
   g. a fourth indexing means that rotatably positions the fourth face means with respect to the first face means;

h. a first indicator means that is located above the first face means, wherein the first indicator means is rotatable to indicate one of the first plurality of counting symbols on the first face means;
i. a second indicator means that is located above the first face means, wherein the second indicator means is rotatable to indicate one of the first plurality of counting symbols on the first face means;
j. a third indicator means that is located above the first face means, wherein the third indicator means is rotatable to indicate one of the first plurality of counting symbols on the first face means; and
k. a base means that secures the first face means, the second face means, the third face means, and the fourth face means, and wherein at least one of a post means or the base means coaxially aligns the first face means, the second face means, the third face means, and the fourth face means.

\* \* \* \* \*